(12) United States Patent
Liao et al.

(10) Patent No.: US 9,599,790 B2
(45) Date of Patent: Mar. 21, 2017

(54) OPTICAL IMAGE CAPTURING SYSTEM

(71) Applicant: ABILITY OPTO-ELECTRONICS TECHNOLOGY CO., LTD., Taichung (TW)

(72) Inventors: Kuo-Yu Liao, Taichung (TW);
Hung-Wen Lee, Taichung (TW);
Yao-Wei Liu, Taichung (TW);
Yeong-Ming Chang, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 20 days.

(21) Appl. No.: 14/721,904

(22) Filed: May 26, 2015

(65) Prior Publication Data

US 2016/0161707 A1 Jun. 9, 2016

(30) Foreign Application Priority Data

Dec. 4, 2014 (TW) .............................. 103142253 A

(51) Int. Cl.
*G02B 3/02* (2006.01)
*G02B 13/18* (2006.01)
*G02B 13/00* (2006.01)

(52) U.S. Cl.
CPC ................. *G02B 13/004* (2013.01)

(58) Field of Classification Search
CPC ...... G02B 3/04; G02B 13/004; G02B 13/002; G02B 9/34
USPC .................................. 359/642–830
See application file for complete search history.

(56) References Cited

FOREIGN PATENT DOCUMENTS

TW 201425997 A 7/2014
TW 201437676 A 10/2014

OTHER PUBLICATIONS

Examination Report for TW 103142253 dated Mar. 20, 2015, 5 pages.
Search Report for TW 103142253 dated Aug. 20, 2015, 1 pages.

*Primary Examiner* — Mahidere Sahle
(74) *Attorney, Agent, or Firm* — Tracy M. Heims; Apex Juris, pllc

(57) ABSTRACT

The invention discloses a four-piece optical lens for capturing image and a four-piece optical module for capturing image. In order from an object side to an image side, the optical lens along the optical axis comprises a first lens with positive refractive power; a second lens with refractive power; a third lens with refractive power; and a fourth lens with refractive power; and wherein at least one of the image-side surface and object-side surface of each of the four lens elements is aspheric whereby the optical lens can increase aperture value and improve the imagining quality for use in compact cameras.

25 Claims, 16 Drawing Sheets

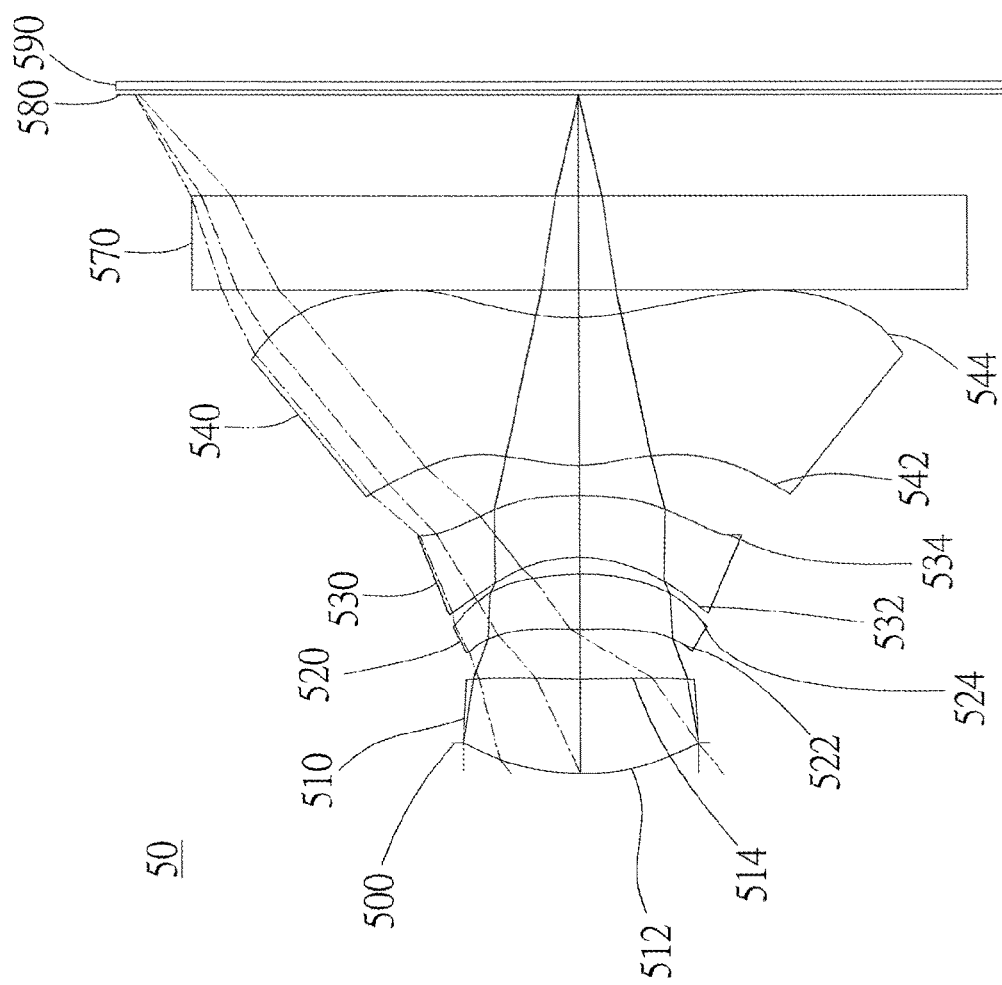

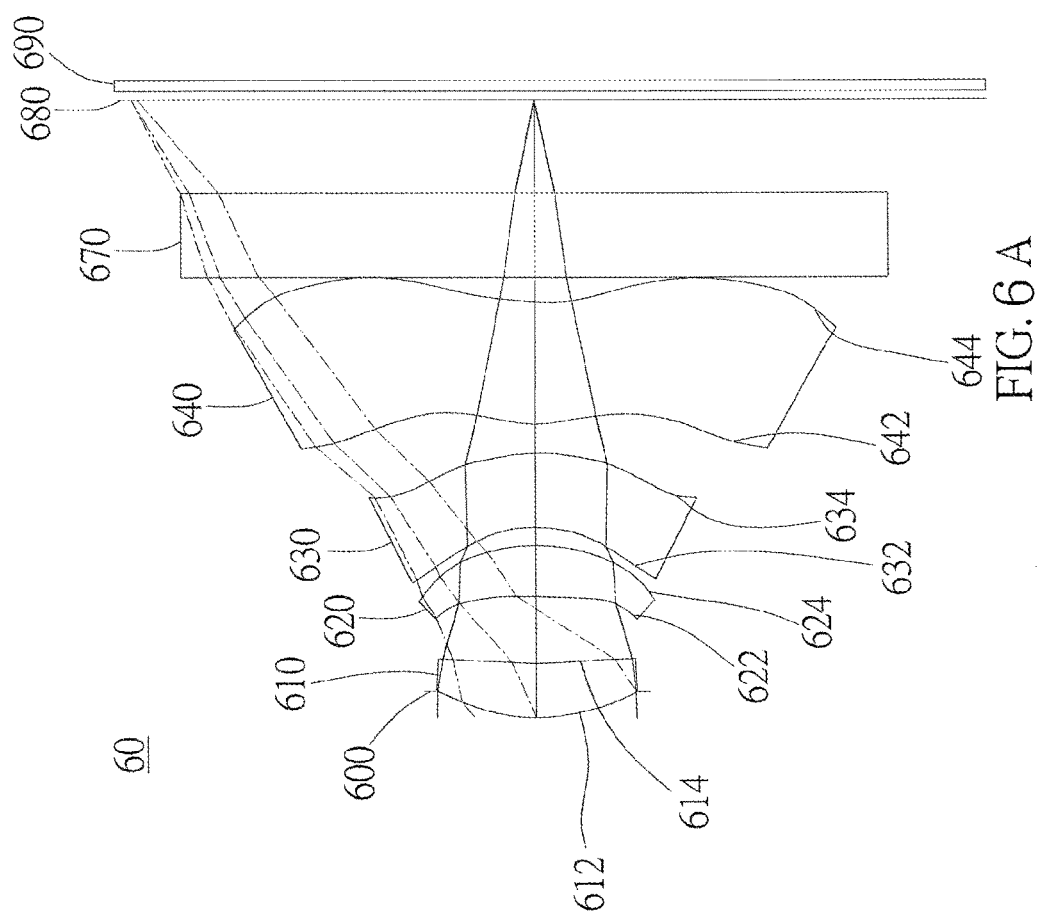

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The conventional optical system of the portable electronic device usually has a two or three-piece lens. However, the optical system is asked to take pictures in a dark environment, in other words, the optical system is asked to have a large aperture. An optical system with large aperture usually has several problems, such as large aberration, poor image quality at periphery of the image, and hard to manufacture. In addition, an optical system of wide-angle usually has large distortion. Therefore, the conventional optical system provides high optical performance as required.

It is an important issue to increase the quantity of light entering the lens and the angle of field of the lens. In addition, the modern lens is also asked to have several characters, including high pixels, high image quality, small in size, and high optical performance.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens element:

A height for image formation of the optical image capturing system is denoted by HOI. A height of the optical image capturing system is denoted by HOS. A distance from the object-side surface of the first lens element to the image-side surface of the fourth lens element is denoted by InTL. A distance from the image-side surface of the fourth lens to the image plane is denoted by InB. InTL+InB=HOS. A distance from the first lens element to the second lens element is denoted by IN12 (instance). A central thickness of the first lens element of the optical image capturing system on the optical axis is denoted by TP1 (instance).

The lens parameter related to a material in the lens:

An Abbe number of the first lens element in the optical image capturing system is denoted by NA1 (instance). A refractive index of the first lens element is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens

An entrance pupil diameter of the optical image capturing system is denoted by HEP.

The lens parameter related to a depth of the lens shape

A distance in parallel with an optical axis from a maximum effective semi diameter position to an axial point on the object-side surface of the fourth lens is denoted by InRS41 (instance). A distance in parallel with an optical axis from a maximum effective semi diameter position to an axial point on the image-side surface of the fourth lens is denoted by InRS42 (instance).

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C31 on the object-side surface of the third lens and the optical axis is HVT31 (instance). A distance perpendicular to the optical axis between a critical point C32 on the image-side surface of the third lens and the optical axis is HVT32 (instance). A distance perpendicular to the optical axis between a critical point C41 on the object-side surface of the fourth lens and the optical axis is HVT41 (instance). A distance perpendicular to the optical axis between a critical point C42 on the image-side surface of the fourth lens and the optical axis is HVT42 (instance). The object-side surface of the fourth lens has one inflection point IF411 which is nearest to the optical axis, and the sinkage value of the inflection point IF411 is denoted by SGI411. A distance perpendicular to the optical axis between the inflection point IF411 and the optical axis is HIF411 (instance). The image-side surface of the fourth lens has one inflection point IF421 which is nearest to the optical axis, and the sinkage value of the inflection point IF421 is denoted by SGI421 (instance). A distance perpendicular to the optical axis between the inflection point IF421 and the optical axis is HIF421 (instance). The object-side surface of the fourth lens has one inflection point IF412 which is the second nearest to the optical axis, and the sinkage value of the inflection point IF412 is denoted by SGI412 (instance). A distance perpendicular to the optical axis between the inflection point IF412 and the optical axis is HIF412 (instance). The image-side surface of the fourth lens has one inflection point IF422 which is the second nearest to the optical axis, and the sinkage value of the inflection point IF422 is denoted by SGI422 (instance). A distance perpendicular to the optical axis between the inflection point IF422 and the optical axis is HIF422 (instance).

The lens element parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The present invention provides an optical image capturing system, in which the fourth lens is provided with an inflection point at the object-side surface or at the image-side surface to adjust the incident angle of each view field and modify the ODT and the TDT. In addition, the surfaces of the fourth lens are capable of modifying the optical path to improve the imagining quality.

The optical image capturing system of the present invention includes a first lens, a second lens, a third lens, and a fourth lens in order along an optical axis from an object side to an image side. The first lens has positive refractive power, and the fourth lens has refractive power. Both the object-side surface and the image-side surface of the fourth lens are aspheric surfaces. The optical image capturing system satisfies:

$$1.2 \leq f/HEP \leq 3.5;\ 0.5 \leq HOS/f \leq 3.0;\ 0 < \Sigma |InRS|/InTL \leq 3;$$

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the third lens; and $\Sigma |InRS|$ is of an sum of absolute values of the displacements in parallel with the optical axis of each lens with refractive power from the central point to the point at the maximum effective semi diameter, i.e. $\Sigma |InRS|=InRSO+InRSI$ while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface.

The present invention further provides an optical image capturing system, including a first lens, a second lens, a third lens, and a fourth lens in order along an optical axis from an object side to an image side. The first lens has positive refractive power, and both the object-side surface and the image-side surface thereof are aspheric surfaces. The second lens has refractive power, and the third lens have refractive power. The fourth lens has refractive power, and both an object-side surface and an image-side surface thereof are aspheric surfaces. The optical image capturing system satisfies:

$$1.2 \leq f/HEP \leq 3.5;\ 0.5 \leq HOS/f \leq 3.0;\ 0 < \Sigma |InRS|/InTL \leq 3;\\ |TDT| < 60\%;\ \text{and}\ |ODT| \leq 50\%;$$

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; ODT is an optical distortion; InTL is a distance between the object-side surface of the first lens and the image-side surface of the third lens; and $\Sigma |InRS|$ is of an sum of absolute values of the displacements in parallel with the optical axis of each lens with refractive power from the central point to the point at the maximum effective semi diameter, i.e. $\Sigma |InRS|=InRSO+InRSI$ while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface.

The present invention further provides an optical image capturing system, including a first lens, a second lens, a third lens, and a fourth lens in order along an optical axis from an object side to an image side. The first lens has positive refractive power, and both an object-side surface and an image-side surface thereof are aspheric surfaces. The second lens has negative refractive power. The third lens has refractive power. The fourth lens has refractive power, and at least one inflection point on at least one surface thereof, wherein both an object-side surface and an image-side surface thereof are aspheric surfaces. The optical image capturing system satisfies:

$$1.2 \leq f/HEP \leq 3.5;\ 0.4 \leq |\tan(HAF)| \leq 3.0;\ 0.5 \leq HOS/f \leq 3.0;\\ |TDT| < 1.5\%; |ODT| \leq 2.5\%;\ \text{and}\ 0 < \Sigma |InRS|/InTL \leq 3;$$

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; ODT is an optical distortion; InTL is a distance between the object-side surface of the first lens and the image-side surface of the third lens; and $\Sigma |InRS|$ is of an sum of absolute values of the displacements in parallel with the optical axis of each lens with refractive power from the central point to the point at the maximum effective semi diameter, i.e. $\Sigma |InRS|=InRSO+InRSI$ while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface.

In an embodiment, the optical image capturing system further includes an image sensor with a size less than 1/1.2" in diagonal, a preferred size is 1/2.3", and a pixel less than 1.4 μm. A preferable pixel size of the image sensor is less than 1.12 μm, and more preferable pixel size is less than 0.9 μm. A 16:9 image sensor is available for the optical image capturing system of the present invention.

In an embodiment, the optical image capturing system of the present invention is available to high-quality (4K2K, so called UHD and QHD) recording, and provides high quality of image.

In an embodiment, a height of the optical image capturing system (HOS) can be reduced while $|f1| > f4$.

In an embodiment, when the lenses satisfy $|f2|+|f3|>|f1|+|f4|$, at least one of the lenses from the second lens to the third lens could have weak positive refractive power or weak negative refractive power. The weak refractive power indicates that an absolute value of the focal length is greater than 10. When at least one of the lenses from the second lens to the third lens could have weak positive refractive power, it may share the positive refractive power of the first lens, and on the contrary, when at least one of the lenses from the second lens to the third lens could have weak negative refractive power, it may finely modify the aberration of the system.

In an embodiment, the fourth lens can have negative refractive power, and an image-side surface thereof is concave, it may reduce back focal length and size. Besides, the fourth lens has at least an inflection point on at least a surface thereof, which may reduce an incident angle of the light of an off-axis field of view and modify the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
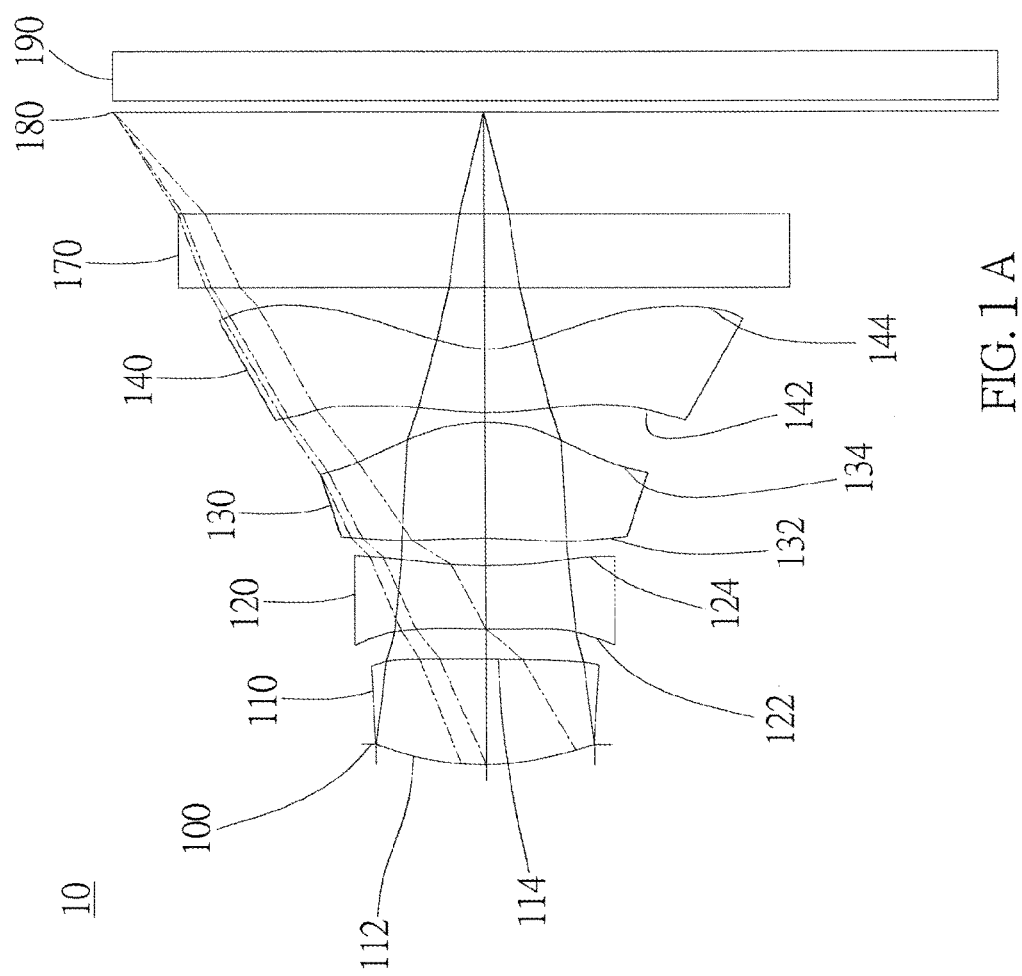
FIG. 1A is a schematic diagram of a first preferred embodiment of the present invention.

An optical image capturing system of the present invention includes a first lens, a second lens, a third lens, and a forth lens from an object side to an image side. The optical image capturing system further is provided with an image sensor at an image plane.

The optical image capturing system works in three wavelengths, including 486.1 nm, 587.5 nm, and 656.2 nm, wherein 587.5 nm is the main reference wavelength, and 555 nm is adopted as the main reference wavelength for extracting features.

The optical image capturing system of the present invention satisfies $0.5 \leq \Sigma PPR/|\Sigma NPR| \leq 4.5$, and a preferable range is $1 \leq \Sigma PPR/|\Sigma NPR| \leq 3.5$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; and $\Sigma NPR$ is a sum of the NPRs of each negative lens. It is helpful to control of an entire refractive power and an entire length of the optical image capturing system.

HOS is a height of the optical image capturing system, and when the ratio of HOS/f approaches to 1, it is helpful for decrease of size and increase of imaging quality.

In an embodiment, the optical image capturing system of the present invention satisfies $0 < \Sigma PP \leq 200$ and $f1/\Sigma PP \leq 0.85$, and a preferable range is $0 < \Sigma PP \leq 150$ and $0.01 \leq f1/\Sigma PP \leq 0.6$, where $\Sigma PP$ is a sum of a focal length fp of each lens with positive refractive power, and $\Sigma NP$ is a sum of a focal length fn of each lens with negative refractive power. It is helpful to control of focusing capacity of the system and redistribution of the positive refractive powers of the system to avoid the significant aberration in early time.

The first lens can have positive refractive power, and an object-side surface, which faces the object side, thereof is convex. It may modify the positive refractive power of the first lens as well as shorten the entire length of the system.

The second lens has negative refractive power, which may correct the aberration of the first lens.

The third lens has positive refractive power, which may share the positive refractive power of the first lens.

The fourth lens has negative refractive power, and an image-side surface thereof, which faces the image side, is concave. It may shorten a rear focal length to reduce the size of the system. In addition, the fourth lens is provided with at least an inflection point on at least a surface to reduce an incident angle of the light of an off-axis field of view and modify the aberration of the off-axis field of view. It is preferable that each surface, the object-side surface and the image-side surface, of the fourth lens has at least an inflection point.

The image sensor is provided on the image plane. The optical image capturing system of the present invention satisfies HOS/HOI≤3 and 0.5≤HOS/f≤3.0, and a preferable range is 1≤HOS/HOI≤2.5 and 1≤HOS/f≤2, where HOI is height for image formation of the optical image capturing system, i.e., the maximum image height, and HOS is a height of the optical image capturing system, i.e. a distance on the optical axis between the object-side surface of the first lens and the image plane. It is helpful for reduction of size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.5≤InS/HOS≤1.1, and a preferable range is 0.8≤InS/HOS≤1, where InS is a distance between the aperture and the image plane. It is helpful for size reduction and wide angle.

The optical image capturing system of the present invention satisfies 0.45≤ΣTP/InTL<0.95, where InTL is a distance between the object-side surface of the first lens and the image-side surface of the fourth lens, and ΣTP is a sum of central thicknesses of the lenses on the optical axis. It is helpful for the contrast of image and yield rate of manufacture, and provides a suitable back focal length for installation of other elements.

The optical image capturing system of the present invention satisfies 0.1≤|R1/R2|≤0.5, and a preferable range is 0.1≤|R1/R2|≤0.45, where R1 is a radius of curvature of the object-side surface of the first lens, and R2 is a radius of curvature of the image-side surface of the first lens. It provides the first lens with a suitable refractive power to reduce the increase rate of the spherical aberration.

The optical image capturing system of the present invention satisfies −200<(R7−R8)/(R7+R8)<30, where R7 is a radius of curvature of the object-side surface of the fourth lens, and R8 is a radius of curvature of the image-side surface of the fourth lens. It may modify the astigmatic field curvature.

The optical image capturing system of the present invention satisfies 0<IN12/f≤0.25, and a preferable range is 0.01≤IN12/f≤0.20, where IN12 is a distance on the optical axis between the first lens and the second lens. It may correct chromatic aberration and improve the performance.

The optical image capturing system of the present invention satisfies 1≤(TP1+IN12)/TP2≤10, where TP1 is a central thickness of the first lens on the optical axis, and TP2 is a central thickness of the second lens on the optical axis. It may control the sensitivity of manufacture of the system and improve the performance.

The optical image capturing system of the present invention satisfies 0.2≤(TP4+IN34)/TP4≤3, where TP3 is a central thickness of the third lens on the optical axis, TP4 is a central thickness of the fourth lens on the optical axis, and IN34 is a distance between the third lens and the fourth lens. It may control the sensitivity of manufacture of the system and improve the performance.

The optical image capturing system of the present invention satisfies 0.1≤(TP2+TP3)/ΣTP≤0.9, and a preferable range is 0.4≤(TP2+TP3)/ΣTP≤0.8. It may finely modify the aberration of the incident rays and reduce the height of the system.

The optical image capturing system of the present invention satisfies 0 mm<|InRS11|+|InRS12|≤2 mm and 1.0≤(|InRS11|+TP1+|InRS12|)/TP1≤3, where InRS11 is a displacement in parallel with the optical axis from a point on the object-side surface of the first lens, through which the optical axis passes, to a point at the maximum effective semi diameter of the object-side surface of the first lens, wherein InRS11 is positive while the displacement is toward the image side, and InRS11 is negative while the displacement is toward the object side; InRS12 is a displacement in parallel with the optical axis from a point on the image-side surface of the first lens, through which the optical axis passes, to a point at the maximum effective semi diameter of the image-side surface of the first lens; and TP1 is a central thickness of the first lens on the optical axis. It may control a ratio of the central thickness of the first lens and the effective semi diameter thickness (thickness ratio) to increase the yield rate of manufacture.

The optical image capturing system of the present invention satisfies 0 mm<|InRS21|+|InRS22|≤2 mm; and 1.0≤(|InRS21|+TP2+|InRS22|)/TP2≤5, where InRS21 is a displacement in parallel with the optical axis from a point on the object-side surface of the second lens, through which the optical axis passes, to a point at the maximum effective semi diameter of the object-side surface of the first lens; InRS22 is a displacement in parallel with the optical axis from a point on the image-side surface of the second lens, through which the optical axis passes, to a point at the maximum effective semi diameter of the image-side surface of the second lens; and TP2 is a central thickness of the second lens on the optical axis. It may control a ratio of the central thickness of the second lens and the effective semi diameter thickness (thickness ratio) to increase the yield rate of manufacture.

The optical image capturing system of the present invention satisfies 0 mm<|InRS31|+|InRS32|≤2 mm; and 1.0≤(|InRS31|+TP3+|InRS32|)/TP3≤10, where InRS31 is a displacement in parallel with the optical axis from a point on the object-side surface of the third lens, through which the optical axis passes, to a point at the maximum effective semi diameter of the object-side surface of the first lens; InRS32 is a displacement in parallel with the optical axis from a point on the image-side surface of the third lens, through which the optical axis passes, to a point at the maximum effective semi diameter of the image-side surface of the third lens; and TP3 is a central thickness of the third lens on the optical axis. It may control a ratio of the central thickness of the third lens and the effective semi diameter thickness (thickness ratio) to increase the yield rate of manufacture.

The optical image capturing system of the present invention satisfies 0 mm<|InRS41|+|InRS42|≤5 mm; and 1.0<(|InRS41|+TP4+|InRS42|)/TP4≤10, where InRS41 is a displacement in parallel with the optical axis from a point on the object-side surface of the fourth lens, through which the optical axis passes, to a point at the maximum effective semi diameter of the object-side surface of the first lens; InRS42 is a displacement in parallel with the optical axis from a point on the image-side surface of the fourth lens, through which the optical axis passes, to a point at the maximum effective semi diameter of the image-side surface of the fourth lens; and TP4 is a central thickness of the fourth lens on the optical axis. It may control a ratio of the central thickness of the fourth lens and the effective semi diameter thickness (thickness ratio) to increase the yield rate of manufacture.

The optical image capturing system of the present invention satisfies 0<Σ|InRS|≤15 mm, where Σ|InRS| is of an sum of absolute values of the displacements in parallel with the optical axis of each lens with refractive power from the central point to the point at the maximum effective semi diameter, i.e. Σ|InRS|=InRSO+InRSI while InRSO is of a sum of absolute values of the displacements in parallel with the optical axis of each lens with refractive power from the central point on the object-side surface to the point at the maximum effective semi diameter of the object-side surface, i.e. InRSO=|InRS11|+|InRS21|+|InRS31|+|InRS41| and InRSI is of a sum of absolute values of the displacements in parallel with the optical axis of each lens with refractive power from the central point on the image-side surface to the point at the maximum effective semi diameter of the image-side surface, i.e. InRSI=|InRS12|+|InRS22|+|InRS32|+|InRS42|. It may increase the capability of modifying the off-axis view field aberration of the system.

The optical image capturing system of the present invention satisfies 0<Σ|InRS|/InTL≤3 and 0≤Σ|InRS|/HOS≤2. It may reduce the total height of the system as well as efficiently increase the capability of modifying the off-axis view field aberration of the system.

The optical image capturing system of the present invention satisfies 0<|InRS31|+|InRS32|+|InRS41|+|InRS42|≤8 mm; 0<(|InRS31|+|InRS32|+|InRS41|+|InRS42|)/InTL≤3; and 0<(|InRS31|+|InRS32|+|InRS41|+|InRS42|)/HOS≤2. It could increase the yield rate of manufacture of the two lenses, which are the first and the second closest to the image side, and increase the capability of modifying the off-axis view field aberration of the system.

The optical image capturing system of the present invention satisfies HVT31≥0 mm and HVT32≥0 mm, where HVT31 a distance perpendicular to the optical axis between the critical point on the object-side surface of the third lens and the optical axis; and HVT32 a distance perpendicular to the optical axis between the critical point on the image-side surface of the third lens and the optical axis. It may efficiently modify the off-axis view field aberration of the system.

The optical image capturing system of the present invention satisfies HVT41≥0 mm and HVT42≥0 mm, where HVT41 a distance perpendicular to the optical axis between the critical point on the object-side surface of the fourth lens and the optical axis; and HVT42 a distance perpendicular to the optical axis between the critical point on the image-side surface of the fourth lens and the optical axis. It may efficiently modify the off-axis view field aberration of the system.

The optical image capturing system of the present invention satisfies 0.2≤HVT52/HOI≤0.9, and preferable is 0.3≤HVT52/HOI≤0.8. It is helpful for correction of the aberration of the peripheral view field.

The optical image capturing system of the present invention satisfies 0≤HVT52/HOS≤0.5, and preferable is 0.2≤HVT52/HOS≤0.45. It is helpful for correction of the aberration of the peripheral view field.

In an embodiment, the lenses of high Abbe number and the lenses of low Abbe number are arranged in an interlaced arrangement that could be helpful for correction of aberration of the system.

An equation of aspheric surface is $$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20} \quad (1)$$

where z is a depression of the aspheric surface; k is conic constant; c is reciprocal of radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of refractive power of the system. In addition, the opposite surfaces (object-side surface and image-side surface) of the first to the fourth lenses could be aspheric that can obtain more control parameters to reduce aberration. The number of aspheric glass lenses could be less than the conventional spherical glass lenses that is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention further is provided with a diaphragm to increase image quality.

The optical image capturing system of the present invention could be applied in dynamic focusing optical system. It is superior in correction of aberration and high imaging quality so that it could be allied in lots of fields.

We provide several embodiments in conjunction with the accompanying drawings for the best understanding, which are:

[First Embodiment]

Figure 1B:
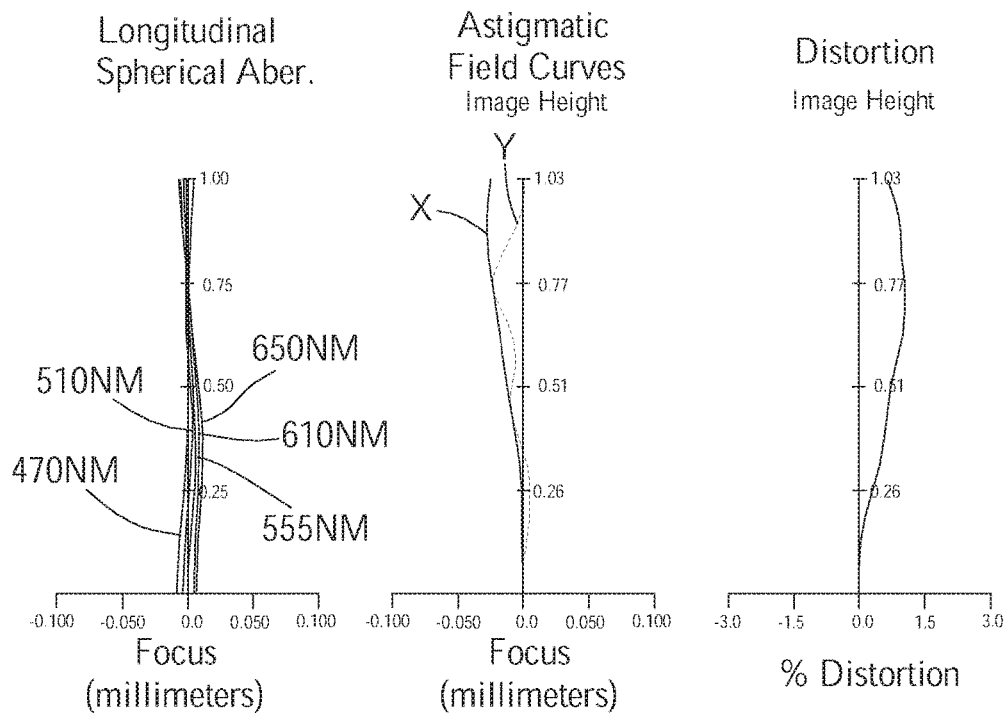
FIG. 1B shows curve diagrams of longitudinal spherical aberration, astigmatic field, and optical distortion of the optical image capturing system in the order from left to right of the first embodiment of the present application.
Figure 1C:
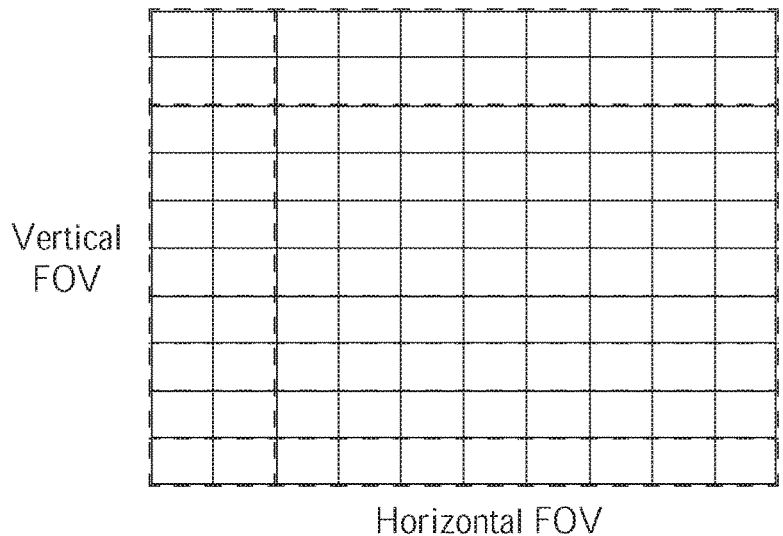
FIG. 1C shows a curve diagram of TV distortion of the optical image capturing system of the first embodiment of the present application.

As shown in FIG. 1A and FIG. 1B, an optical image capturing system 100 of the first preferred embodiment of the present invention includes, along an optical axis from an object side to an image side, an aperture 100, a first lens 110, a second lens 120, a third lens 130, a fourth lens 140, an infrared rays filter 170, an image plane 180, and an image sensor 190.

The first lens 110 has positive refractive power, and is made of plastic. An object-side surface 112 thereof, which faces the object side, is a convex aspheric surface, and an image-side surface 114 thereof, which faces the image side, is a concave aspheric surface, and the object-side surface 112 and the image-side surface 114 both have an inflection point respectively. SGI111 is a displacement in parallel with the optical axis from a point on the object-side surface 112 of the first lens 110, through which the optical axis passes, to the inflection point on the object-side surface 112, which is the closest to the optical axis; SGI121 is a displacement in parallel with the optical axis from a point on the image-side surface 114 of the first lens 110, through which the optical axis passes, to the inflection point on the image-side surface 114, which is the closest to the optical axis.

HIF111 is a displacement perpendicular to the optical axis from a point on the object-side surface 112 of the first lens 110, through which the optical axis passes, to the inflection point, which is the closest to the optical axis; HIF121 is a displacement perpendicular to the optical axis from a point on the image-side surface 114 of the first lens 110, through which the optical axis passes, to the inflection point, which is the closest to the optical axis.

The second lens 120 has negative refractive power, and is made of plastic. An object-side surface 122 thereof, which faces the object side, is a convex aspheric surface, and an image-side surface 124 thereof, which faces the image side, is a concave aspheric surface, and the object-side surface 122 and the image-side surface 124 both have an inflection point respectively. SGI211 is a displacement in parallel with the optical axis from a point on the object-side surface 122 of the second lens 120, through which the optical axis passes, to the inflection point on the object-side surface 122, which is the closest to the optical axis; SGI221 is a displacement in parallel with the optical axis from a point on the image-side surface 124 of the second lens 120, through which the optical axis passes, to the inflection point on the image-side surface 124, which is the closest to the optical axis.

HIF211 is a displacement perpendicular to the optical axis from a point on the object-side surface 122 of the second lens 120, through which the optical axis passes, to the inflection point, which is the closest to the optical axis; HIF221 is a displacement perpendicular to the optical axis from a point on the image-side surface 124 of the second lens 120, through which the optical axis passes, to the inflection point, which is the closest to the optical axis.

The third lens 130 has positive refractive power, and is made of plastic. An object-side surface 132, which faces the object side, is a concave aspheric surface, and an image-side surface 134, which faces the image side, is a convex aspheric surface, wherein the object-side surface 132 has two inflection points, while the image-side surface has an inflection point. SGI311 is a displacement in parallel with the optical axis, from a point on the object-side surface 132 of the third lens 130, through which the optical axis passes, to the inflection point on the object-side surface 132, which is the closest to the optical axis, and SGI321 is a displacement in parallel with the optical axis, from a point on the image-side surface 134 of the third lens 130, through which the optical axis passes, to the inflection point on the image-side surface 134, which is the closest to the optical axis.

SGI312 is a displacement in parallel with the optical axis, from a point on the object-side surface 132 of the third lens 130, through which the optical axis passes, to the inflection point on the object-side surface 132, which is the second closest to the optical axis.

HIF311 is a distance perpendicular to the optical axis between the inflection point on the object-side surface 132 of the third lens 130, which is the closest to the optical axis, and the optical axis, and HIF321 is a distance perpendicular to the optical axis between the inflection point on the image-side surface 134 of the third lens 130, which is the closest to the optical axis, and the optical axis.

HIF312 is a distance perpendicular to the optical axis between the inflection point on the object-side surface 132 of the third lens 130, which is the second the closest to the optical axis, and the optical axis.

The fourth lens 140 has negative refractive power, and is made of plastic. An object-side surface 142 thereof which faces the object side is a convex aspheric surface, while an image-side surface 144 thereof which faces the image side is a concave aspheric surface, and the object-side surface 142 has two inflection points, while the image-side surface 144 has an inflection point. SGI411 is a displacement in parallel with the optical axis from a point on the object-side surface 142 of the fourth lens 140, through which the optical axis passes, to the inflection point on the object-side surface 142, which is the closest to the optical axis; SGI421 is a displacement in parallel with the optical axis from a point on the image-side surface 144 of the fourth lens 140, through which the optical axis passes, to the inflection point on the image-side surface 144, which is the closest to the optical axis.

SGI412 is a displacement in parallel with the optical axis, from a point on the object-side surface 142 of the fourth lens 140, through which the optical axis passes, to the inflection point on the object-side surface 142, which is the second closest to the optical axis.

HIF411 is a distance perpendicular to the optical axis between the inflection point on the object-side surface 142 of the fourth lens 140, which is the closest to the optical axis, and the optical axis; HIF421 is a distance perpendicular to the optical axis between the inflection point on the image-side surface 142 of the fourth lens 140, which is the closest to the optical axis, and the optical axis.

HIF412 is a distance perpendicular to the optical axis between the inflection point on the object-side surface 142 of the fourth lens 140, which is the second the closest to the optical axis, and the optical axis.

The infrared rays filter 170 is made of glass, and between the fourth lens 140 and the image plane 180. The infrared rays filter 170 gives no contribution to the focal length of the system.

The optical image capturing system of the first preferred embodiment has the following parameters, which are f=1.32952 mm; f/HEP=1.83; and HAF=37.5 degrees and tan(HAF)=0.7673, where f is a focal length of the system; HAF is a half of the maximum field angle; and HEP is an entrance pupil diameter.

The parameters of the lenses of the first preferred embodiment are f1=1.6074 mm; |f/f1|=0.8271; f4=−1.0098 mm; |f1|>f4; and |f1/f4|=1.5918, where f1 is a focal length of the first lens 110; and f4 is a focal length of the fourth lens 140.

The first preferred embodiment further satisfies |f2|+|f3|=4.0717 mm; |f1|+|f4|=2.6172 mm; and |f2|+|f3|>|f1|+|f4|, where f2 is a focal length of the second lens 120; f3 is a focal length of the third lens 130; and f4 is a focal length of the fourth lens 140.

The optical image capturing system of the first preferred embodiment further satisfies ΣPPR=f/f1+f/f3=2.4734; ΣNPR=f/f2+f/f4=−1.7239; ΣPPR/|ΣNPR|=1.4348; |f/f2|=0.4073; |f/f3|=1.6463; and |f/f4|=1.3166, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system of the first preferred embodiment further satisfies InTL+InB=HOS; HOS=1.8503 mm; HOI=1.0280 mm; HOS/HOI=1.7999; HOS/f=1.3917; InTL/HOS=0.6368; and InS/HOS=0.9584, where InTL is a distance between the object-side surface 112 of the first lens 110 and the image-side surface 144 of the fourth lens 140; HOS is a height of the image capturing system, i.e. a distance between the object-side surface 112 of the first lens 110 and the image plane 180; InS is a distance between the aperture 100 and the image plane 180; HOI is height for image formation of the optical image capturing system, i.e., the maximum image height; and InB is a distance between the image-side surface 144 of the fourth lens 140 and the image plane 180.

The optical image capturing system of the first preferred embodiment further satisfies ΣTP=0.9887 mm and ΣTP/InTL=0.8392, where ΣTP is a sum of the thicknesses of the lenses 110-140 with refractive power. It is helpful for the contrast of image and yield rate of manufacture, and provides a suitable back focal length for installation of other elements.

The optical image capturing system of the first preferred embodiment further satisfies |R1/R2|=0.1252, where R1 is a radius of curvature of the object-side surface 112 of the first lens 110, and R2 is a radius of curvature of the image-side surface 114 of the first lens 110. It provides the first lens with a suitable refractive power to reduce the increase rate of the spherical aberration.

The optical image capturing system of the first preferred embodiment further satisfies (R7−R8)/(R7+R8)=0.4810, where R7 is a radius of curvature of the object-side surface 142 of the fourth lens 140, and R8 is a radius of curvature of the image-side surface 144 of the fourth lens 140. It may modify the astigmatic field curvature.

The optical image capturing system of the first preferred embodiment further satisfies ΣPP=f1+f3=2.4150 mm and f1/(f1+f3)=0.6656, where ΣPP is a sum of the focal lengths fp of each lens with positive refractive power. It is helpful to share the positive refractive power of the first lens 110 to the other positive lens to avoid the significant aberration caused by the incident rays.

The optical image capturing system of the first preferred embodiment further satisfies ΣNP=f2+f4=−4.2739 mm and f4/(f2+f4)=0.7637, where f2, and f4 are focal lengths of the second and the fourth lenses 120, 140 respectively, and ΣNP is a sum of the focal lengths fn of each lens with negative refractive power. It is helpful to share the negative refractive power of the fourth lens 140 to the other negative lens to avoid the significant aberration caused by the incident rays.

The optical image capturing system of the first preferred embodiment further satisfies IN12=0.0846 mm and IN12/f=0.0636, where IN12 is a distance on the optical axis between the first lens 110 and the second lens 120. It may correct chromatic aberration and improve the performance.

The optical image capturing system of the first preferred embodiment further satisfies TP1=0.2979 mm; TP2=0.1800 mm; and (TP1+IN12)/TP2=2.1251, where TP1 is a central thickness of the first lens 110 on the optical axis, and TP2 is a central thickness of the second lens 120 on the optical axis. It may control the sensitivity of manufacture of the system and improve the performance.

The optical image capturing system of the first preferred embodiment further satisfies TP3=0.3308 mm; TP4=0.1800 mm; and (TP4+IN34)/TP3=0.6197, where TP3 is a central thickness of the third lens 130 on the optical axis, TP4 is a central thickness of the fourth lens 140 on the optical axis, and IN34 is a distance on the optical axis between the third lens 130 and the fourth lens 140. It may control the sensitivity of manufacture of the system and improve the performance.

The optical image capturing system of the first preferred embodiment further satisfies (TP2+TP3)/ΣTP=0.5166, where TP2 and TP3 are thicknesses on the optical axis of the second and the third lenses 120, 130, and ΣTP is a sum of the central thicknesses of all the lenses with refractive power on the optical axis. It may finely modify the aberration of the incident rays and reduce the height of the system.

The optical image capturing system of the first preferred embodiment further satisfies |InRS11|=0.07696 mm; |InRS12|=0.03415 mm; TP1=0.29793 mm; and (|InRS11|+TP1+|InRS12|)/TP1=1.3730, where InRS11 is a displacement in parallel with the optical axis from a point on the object-side surface 112 of the first lens 110, through which the optical axis passes, to a point at the maximum effective semi diameter of the object-side surface 112 of the first lens 110; InRS12 is a displacement in parallel with the optical axis from a point on the image-side surface 114 of the first lens 110, through which the optical axis passes, to a point at the maximum effective semi diameter of the image-side surface 114 of the first lens 110; and TP1 is a central thickness of the first lens 110 on the optical axis. It may control a ratio of the central thickness of the first lens and the effective semi diameter thickness (thickness ratio) to increase the yield rate of manufacture.

The optical image capturing system of the first preferred embodiment further satisfies |InRS21|=0.04442 mm; |InRS22|=0.02844 mm; TP2=0.1800 mm; and (|InRS21|+TP2+|InRS22|)/TP2=1.4048, where InRS21 is a displacement in parallel with the optical axis from a point on the object-side surface 122 of the second lens 120, through which the optical axis passes, to a point at the maximum effective semi diameter of the object-side surface 122 of the second lens 120; InRS22 is a displacement in parallel with the optical axis from a point on the image-side surface 124 of the second lens 120, through which the optical axis passes, to a point at the maximum effective semi diameter of the image-side surface 124 of the second lens 120; and TP2 is a central thickness of the second lens 120 on the optical axis. It may control a ratio of the central thickness of the second lens and the effective semi diameter thickness (thickness ratio) to increase the yield rate of manufacture.

The optical image capturing system of the first preferred embodiment further satisfies |InRS31|=0.00187 mm; |InRS32|=0.14522 mm; TP3=0.33081 mm; and (|InRS31|+TP3+|InRS32|)/TP3=1.4446, where InRS31 is a displacement in parallel with the optical axis from a point on the object-side surface 132 of the third lens 130, through which the optical axis passes, to a point at the maximum effective semi diameter of the object-side surface 132 of the third lens 130; InRS32 is a displacement in parallel with the optical axis from a point on the image-side surface 134 of the third lens 130, through which the optical axis passes, to a point at the maximum effective semi diameter of the image-side surface 134 of the third lens 130; and TP3 is a central thickness of the third lens 130 on the optical axis. It may control a ratio of the central thickness of the third lens and the effective semi diameter thickness (thickness ratio) to increase the yield rate of manufacture.

The optical image capturing system of the first preferred embodiment further satisfies |InRS41|=0.03563 mm; |InRS42|=0.06429 mm; TP4=0.1800 mm; and (|InRS41|+TP4+|InRS42|)/TP4=1.5551, where InRS41 is a displacement in parallel with the optical axis from a point on the object-side surface 142 of the fourth lens 140, through which the optical axis passes, to a point at the maximum effective semi diameter of the object-side surface 142 of the fourth lens 140; InRS42 is a displacement in parallel with the optical axis from a point on the image-side surface 144 of the fourth lens 140, through which the optical axis passes, to a point at the maximum effective semi diameter of the image-side surface 144 of the fourth lens 140; and TP4 is a central thickness of the fourth lens 140 on the optical axis. It may control a ratio of the central thickness of the fourth lens and the effective semi diameter thickness (thickness ratio) to increase the yield rate of manufacture.

The optical image capturing system of the first preferred embodiment satisfies InRSO=0.15888 mm; InRSI=0.27211 mm; and Σ|InRS|=0.43099 mm, where Σ|InRS| is of an sum of absolute values of the displacements in parallel with the optical axis of each lens with refractive power from the central point to the point at the maximum effective semi diameter, i.e. Σ|InRS|=InRSO+InRSI while InRSO is of a sum of absolute values of the displacements in parallel with the optical axis of each lens with refractive power from the central point on the object-side surface to the point at the maximum effective semi diameter of the object-side surface, i.e. InRSO=|InRS11|+|InRS21|+|InRS31|+|InRS41| and InRSI is of a sum of absolute values of the displacements in parallel with the optical axis of each lens with refractive power from the central point on the image-side surface to the point at the maximum effective semi diameter of the image-side surface, i.e. InRSI=|InRS12|+|InRS22|+|InRS32|+|InRS42|. It may increase the capability of modifying the off-axis view field aberration of the system.

The optical image capturing system of the first preferred embodiment satisfies Σ|InRS|/InTL=0.36580 and Σ|InRS|/HOS=0.23293. It may reduce the total height of the system as well as efficiently increase the capability of modifying the off-axis view field aberration of the system.

The optical image capturing system of the first preferred embodiment satisfies |InRS31|+|InRS32|+|InRS41|+|InRS42|≤0.43099 mm; (|InRS31|+|InRS32|+|InRS41|+|InRS42|)/InTL≤0.20965; and (|InRS31|+|InRS32|+|InRS41|+|InRS42|)/HOS≤0.13350. It could increase the yield rate of manufacture of the two lenses, which are the first and the second closest to the image side, and increase the capability of modifying the off-axis view field aberration of the system.

The optical image capturing system of the first preferred embodiment further satisfies HVT31=0.2386 mm and HVT32=0.4759 mm, where HVT31 is a distance perpendicular to the optical axis between a critical point C31 on the object-side surface 132 of the third lens 130 and the optical axis; HVT32 is a distance perpendicular to the optical axis between a critical point C32 on the image-side surface 134 of the third lens 130 and the optical axis. It may modify the aberration of the off-axis field of view.

The optical image capturing system of the first preferred embodiment further satisfies HVT41=0.3200 mm; HVT42=0.5522 mm; and HVT41/HVT42=0.5795, where HVT41 is a distance perpendicular to the optical axis between a critical point C41 on the object-side surface 142 of the fourth lens 140 and the optical axis; HVT42 is a distance perpendicular to the optical axis between a critical point C42 on the image-side surface 144 of the fourth lens 140 and the optical axis. It may modify the aberration of the off-axis field of view.

The optical image capturing system of the first preferred embodiment further satisfies HVT42/HOI=0.5372. It may correct the aberration of the spherical field of view.

The optical image capturing system of the first preferred embodiment further satisfies HVT42/HOS=0.2985. It may correct the aberration of the spherical field of view.

The optical image capturing system of the first preferred embodiment further satisfies NA4/NA2=1, where NA2 is an Abbe number of the second lens 120, and NA4 is an Abbe number of the fourth lens 140. It may correct the aberration of the system.

The optical image capturing system of the first preferred embodiment further satisfies 0<(|InRS22|+|InRS31|)/IN23=0.37938 and 0<(|InRS32|+|InRS41|)/IN34=7.23406. It may increase the adjustment capacity of the difference of the optical path, and keep the miniature size.

The optical image capturing system of the first preferred embodiment further satisfies |TDT|=0.4353% and |ODT|=1.0353%, where TDT is TV distortion; and ODT is optical distortion.

The parameters of the lenses of the first embodiment are listed in Table 1 and Table 2.

TABLE 1 f = 1.3295 mm; f/HEP = 1.83; HAF = 37.5 deg; tan(HAF) = 0.7673

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1st lens/Aperture | 0.78234 | 0.29793 | plastic | 1.544 | 56.06 | 1.607 |
| 2 | | 6.24733 | 0.08459 | | | | |
| 3 | 2nd lens | 4.14538 | 0.18000 | plastic | 1.642 | 22.46 | −3.264 |
| 4 | | 1.37611 | 0.07989 | | | | |
| 5 | 3rd lens | −1.86793 | 0.33081 | plastic | 1.544 | 56.06 | 0.808 |
| 6 | | −0.37896 | 0.02500 | | | | |
| 7 | 4th lens | 0.91216 | 0.18000 | plastic | 1.544 | 56.06 | −1.010 |
| 8 | | 0.31965 | 0.17206 | | | | |
| 9 | Filter | plane | 0.21 | BK7_SCHOTT | | | |
| 10 | | plane | 0.29 | | | | |
| 11 | Image plane | plane | | | | | |
| 12 | | | | | | | |

Reference wavelength: 555 nm.

The clear aperture of the third surface is 0.36 mm.

TABLE 2

Coefficients of the aspheric surfaces

| Surface | 1 | 2 | 3 | 4 | 5 | 6 | 7 | 8 |
|---|---|---|---|---|---|---|---|---|
| k | 5.76611E−01 | 0.00000E+00 | 1.97452E+01 | 7.33565E+00 | 0.00000E+00 | −2.09962E+00 | −2.65841E+01 | −5.02153E+00 |
| A4 | −5.51709E−01 | −2.23956E+00 | −3.78546E+00 | −8.00950E−01 | 3.04031E+00 | 1.53566E+00 | −2.73583E+00 | −2.12382E+00 |
| A6 | 1.84419E+00 | −2.09186E+00 | −4.83803E+00 | −1.41685E+01 | −7.06804E+00 | −5.62446E+00 | 2.46306E+01 | 1.01033E+01 |
| A8 | −5.57618E+01 | −3.33312E+01 | −1.43809E+02 | 8.62637E+01 | −1.72158E+01 | 1.96904E+01 | −2.14097E+02 | −4.02636E+01 |
| A10 | 3.45594E+02 | 3.76727E+02 | 3.15322E+03 | −3.68614E+02 | 8.52740E+01 | 1.00740E+02 | 1.17330E+03 | 1.06276E+02 |
| A12 | −1.49452E+03 | −1.16899E+03 | −1.72284E+04 | 1.49654E+03 | 4.79654E+02 | −2.01751E+02 | −3.91183E+03 | −1.77404E+02 |
| A14 | | | 3.30750E+04 | −4.00967E+03 | −5.54044E+03 | −9.63345E+02 | 7.77524E+03 | 1.78638E+02 |
| A16 | | | | | 1.16419E+04 | −5.33613E+00 | −8.46792E+03 | −1.05883E+02 |
| A18 | | | | | 6.99649E+04 | 6.97327E+03 | 3.92598E+03 | 3.92300E+01 |
| A20 | | | | | −3.30580E+05 | −4.71386E+03 | −6.97617E+01 | −1.03791E+01 |

The detail parameters of the first preferred embodiment are listed in Table 1, in which the unit of radius of curvature, thickness, and focal length are millimeter, and surface 0-14 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

[Second Embodiment]

Figure 2A:
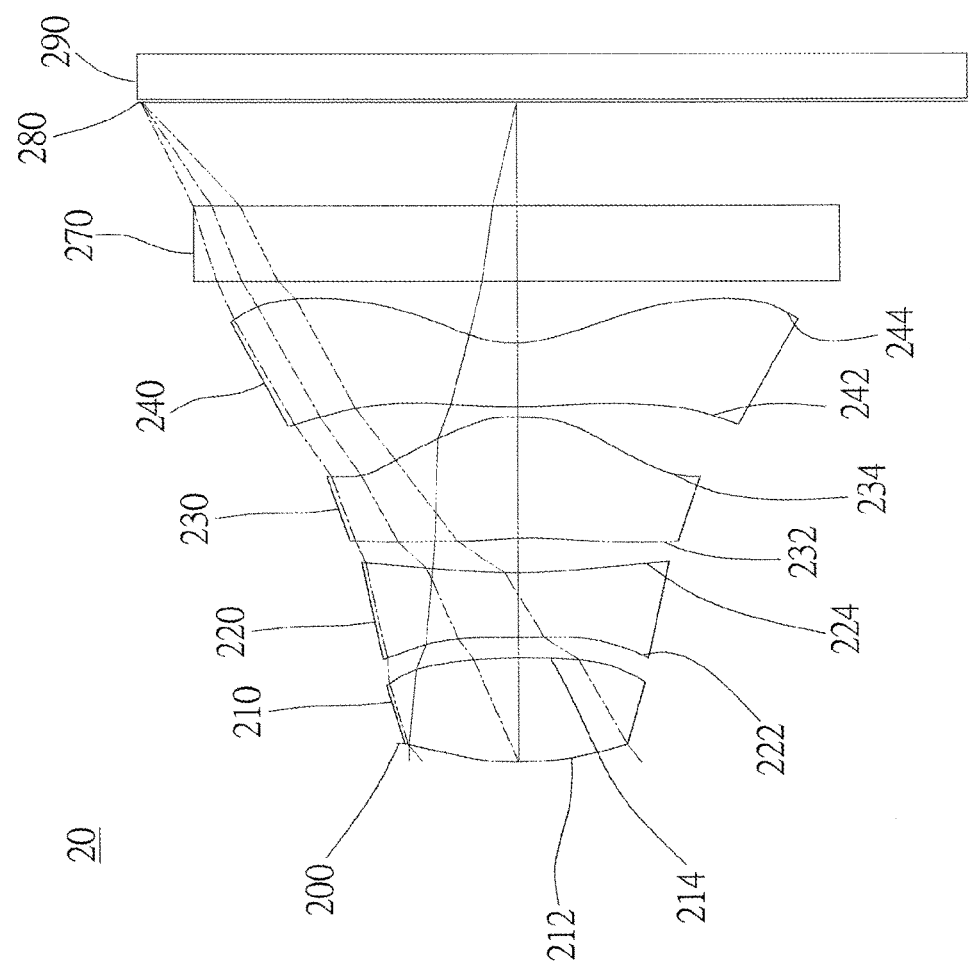
FIG. 2A is a schematic diagram of a second preferred embodiment of the present invention.
Figure 2B:
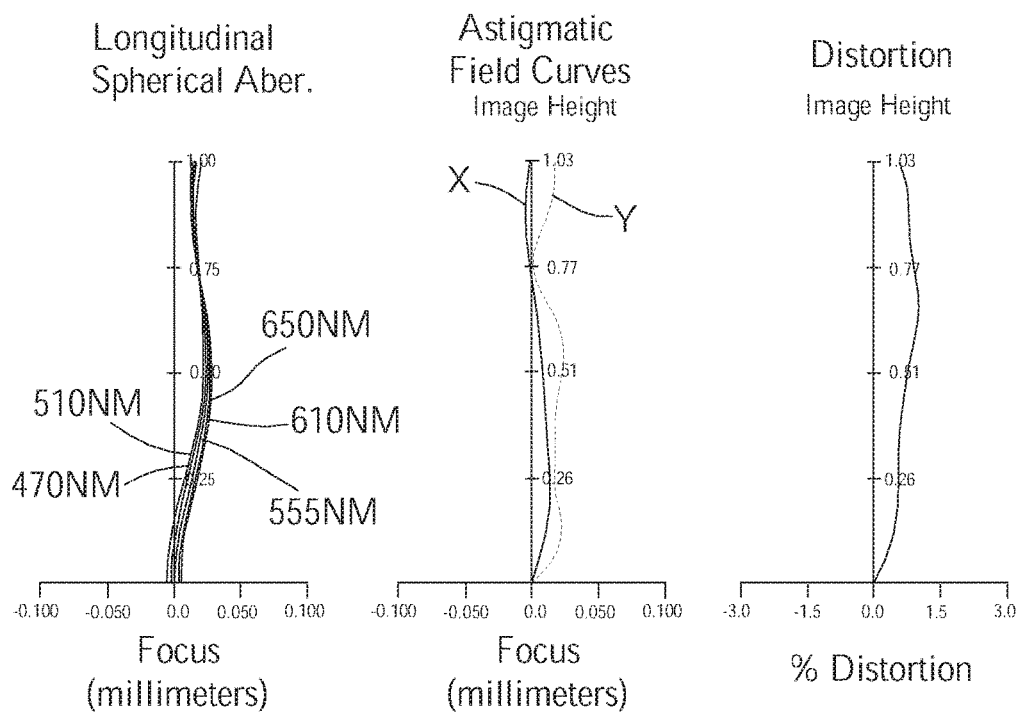
FIG. 2B shows curve diagrams of longitudinal spherical aberration, astigmatic field, and optical distortion of the optical image capturing system in the order from left to right of the second embodiment of the present application.
Figure 2C:
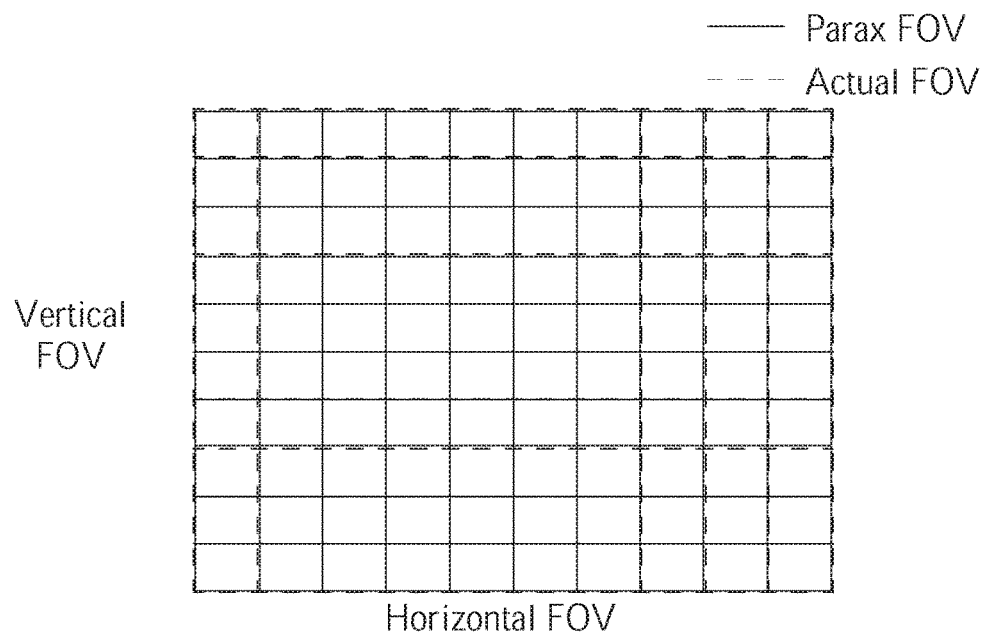
FIG. 2C shows a curve diagram of TV distortion of the optical image capturing system of the second embodiment of the present application.

As shown in FIG. 2A and FIG. 2B, an optical image capturing system of the second preferred embodiment of the present invention includes, along an optical axis from an object side to an image side, an aperture 200, a first lens 210, a second lens 220, a third lens 230, a fourth lens 240, an infrared rays filter 270, an image plane 280, and an image sensor 290.

The first lens 210 has positive refractive power, and is made of plastic. An object-side surface thereof, which faces the object side, is a convex aspheric surface, and an image-side surface thereof, which faces the image side, is a convex aspheric surface.

The second lens 220 has negative refractive power, and is made of plastic. An object-side surface 222 thereof, which faces the object side, is a concave aspheric surface, and an image-side surface 224 thereof, which faces the image side, is a concave aspheric surface. The object-side surface 222 has an inflection point, while the image-side surface 224 has two inflection points.

The third lens 230 has positive refractive power, and is made of plastic. An object-side surface 232, which faces the object side, is a concave aspheric surface, and an image-side surface 234, which faces the image side, is a convex aspheric surface. The object-side surface 232 has two inflection points, while the image-side surface 234 has an inflection point.

The fourth lens 240 has negative refractive power, and is made of plastic. An object-side surface 242 thereof, which faces the object side, is a convex surface, and an image-side surface 244 thereof, which faces the image side, is a concave aspheric surfaces. The object-side surface 242 has two inflection points, while the image-side surface 244 has an inflection point.

The infrared rays filter 270 is made of glass, and between the fourth lens 240 and the image plane 280. The infrared rays filter 270 gives no contribution to the focal length of the system.

The optical image capturing system of the second preferred embodiment has the following parameters, which are |f2|+|f3|=2.8463 mm; |f1|+|f4|=2.1524 mm; and |f2|+|f3|>|f1|+|f4|, where f1 is a focal length of the first lens 210; f2 is a focal length of the second lens 220; f3 is a focal length of the third lens 230; and f4 is a focal length of the fourth lens 240.

The optical image capturing system of the second preferred embodiment further satisfies TP3=0.3419 mm and TP4=0.1800 mm, where TP3 is a thickness of the third lens 230 on the optical axis, and TP4 is a thickness of the fourth lens 240 on the optical axis.

In the second embodiment, the first and the third lenses 210, 230 are positive lenses, and their focal lengths are f1 and f3 respectively. The optical image capturing system of the second preferred embodiment further satisfies ΣPP=f1+f3=2.0394 mm and f1/(f1+f3)=0.6445, where ΣPP is a sum of the focal lengths of each positive lens. It is helpful to share the positive refractive power of the first lens 210 to the other positive lens to avoid the significant aberration caused by the incident rays.

The optical image capturing system of the second preferred embodiment further satisfies ΣNP=f2+f4=−2.9592 mm and f4/(f2+f4)=0.7168, where f2 and f4 are focal lengths of the second and the fourth lenses 220, 240, and ΣNP is a sum of the focal lengths of each negative lens. It is helpful to share the negative refractive power of the fourth lens 240 to the other negative lens to avoid the significant aberration caused by the incident rays.

The optical image capturing system of the first preferred embodiment further satisfies HVT31=0.2938 mm and HVT32=0.4785 mm, where HVT31 is a distance perpendicular to the optical axis between a critical point C31 on the object-side surface 132 of the third lens 130 and the optical axis; HVT32 is a distance perpendicular to the optical axis between a critical point C32 on the image-side surface 134 of the third lens 130 and the optical axis.

The optical image capturing system of the first preferred embodiment further satisfies HVT41=0.2727 mm and HVT42=0.5598 mm, where HVT41 is a distance perpendicular to the optical axis between a critical point C41 on the object-side surface 142 of the fourth lens 140 and the optical axis; HVT42 is a distance perpendicular to the optical axis between a critical point C42 on the image-side surface 144 of the fourth lens 140 and the optical axis.

The optical image capturing system of the first preferred embodiment further satisfies ΣPPR=f/f1+f/f3=2.81647; ΣNPR=f/f2+f/f4=2.19093; and ΣPPR/|ΣNPR|=1.28551, where ΣPPR is a sum of the positive refractive power of all the positive lenses, and ΣNPR is a sum of the negative refractive power of all the negative lenses.

The parameters of the lenses of the second embodiment are listed in Table 3 and Table 4.

TABLE 3 f = 1.3161 mm; f/HEP = 2.2; HAF = 37.4999 deg; tan(HAF) = 0.7673

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1st lens/Aperture | 0.79595 | 0.28690 | plastic | 1.535 | 56.05 | 1.314 |
| 2 | | −5.39261 | 0.06530 | | | | |
| 3 | 2nd lens | −10.03368 | 0.18000 | plastic | 1.636 | 23.89 | −2.121 |
| 4 | | 1.58183 | 0.09560 | | | | |
| 5 | 3rd lens | −1.85091 | 0.34192 | plastic | 1.535 | 56.05 | 0.725 |
| 6 | | −0.34207 | 0.02500 | | | | |
| 7 | 4th lens | 0.95031 | 0.18000 | plastic | 1.535 | 56.05 | −0.838 |
| 8 | | 0.28496 | 0.17538 | | | | |
| 9 | Filter | plane | 0.21 | BK7_SCHOTT | | | |
| 10 | | plane | 0.29 | | | | |
| 11 | Image Plane | plane | | | | | |
| 12 | | | | | | | |

Reference wavelength: 555 nm

TABLE 4

Coefficients of the aspheric surfaces

| Surface | 1 | 2 | 3 | 4 | 5 |
|---|---|---|---|---|---|
| k | −2.63520E+00 | 9.00000E+01 | 7.02705E+01 | 1.04836E+01 | 0.00000E+00 |
| A4 | 2.54572E−01 | −2.78473E+00 | −4.11735E+00 | −7.94187E−01 | 2.01072E+00 |
| A6 | −2.39185E+00 | −6.41042E+00 | −4.75470E+00 | −1.16298E+01 | −2.19396E+00 |
| A8 | −1.44420E+01 | −2.59495E+01 | −1.17215E+02 | 9.92997E+01 | −9.25098E+00 |
| A10 | −4.42055E+01 | 8.80139E+02 | 3.46562E+03 | −5.19480E+02 | −7.47034E+00 |
| A12 | −1.49091E+03 | −4.22124E+03 | −1.90911E+04 | 1.88585E+03 | 1.65866E+02 |
| A14 | 0.00000E+00 | 0.00000E+00 | 3.30750E+04 | −4.00967E+03 | −1.97492E+03 |
| A16 | 0.00000E+00 | 0.00000E+00 | 0.00000E+00 | 0.00000E+00 | 4.45806E+03 |
| A18 | 0.00000E+00 | 0.00000E+00 | 0.00000E+00 | 0.00000E+00 | 6.99649E+04 |
| A20 | 0.00000E+00 | 0.00000E+00 | 0.00000E+00 | 0.00000E+00 | −3.30580E+05 |

| Surface | 6 | 7 | 8 |
|---|---|---|---|
| k | −1.91663E+00 | −7.29999E+01 | −5.48399E+00 |
| A4 | 1.54783E+00 | −2.67149E+00 | −2.01478E+00 |
| A6 | −6.19201E+00 | 2.50952E+01 | 9.86508E+00 |
| A8 | 2.06421E+01 | −2.14629E+02 | −4.00560E+01 |
| A10 | 9.70022E+01 | 1.17159E+03 | 1.06564E+02 |
| A12 | −1.25083E+02 | −3.90951E+03 | −1.77622E+02 |
| A14 | −9.73701E+02 | 7.78461E+03 | 1.77782E+02 |
| A16 | −4.64315E+02 | −8.48455E+03 | −1.04877E+02 |
| A18 | 6.97327E+03 | 3.92598E+03 | 3.92300E+01 |
| A20 | −4.71386E+03 | −6.97617E+01 | −1.03791E+01 |

An equation of the aspheric surfaces of the second embodiment is the same as that of the first embodiment, and the definitions are the same as well.

The exact parameters of the second embodiment (with main reference wavelength as 555 nm) based on Table 3 and Table 4 are listed in the following table:

| Second embodiment (main reference wavelength: 555 nm) | | | | | |
|---|---|---|---|---|---|
| InRS11 | InRS12 | InRS21 | InRS22 | InRS31 | InRS32 |
| 0.01337 | −0.05357 | −0.05604 | 0.03101 | −0.00848 | −0.16816 |
| InRS41 | InRS42 | InRSO | InRSI | Σ|InRS| | |
| −0.04642 | 0.07249 | 0.12431 | 0.32523 | 0.44954 | |
| Σ|InRS|/InTL | Σ|InRS|/HOS | (|InRS22| + |InRS31|)/IN23 | | (|InRS32| + |InRS41|)/IN34 | |
| 0.38268 | 0.24298 | 0.4131 | | 8.5832 | |
| (|InRS31| + |InRS32| + |InRS41| + |InRS42|)/InTL | | | (|InRS31| + |InRS32| + |InRS41| + |InRS42|)/HOS | | |
| 0.25160 | | | 0.15975 | | |
| |f/f1| | |f/f2| | |f/f3| | |f/f4| | |f1/f2| | |f2/f3| |
| 1.00123 | 0.62041 | 1.81523 | 1.57051 | 0.61965 | 2.92584 |
| Σ PPR | Σ NPR | Σ PPR/|Σ NPR| | Σ PP | Σ NP | f1/Σ PP |
| 2.81647 | 2.19093 | 1.28551 | 2.03945 | −2.95924 | 0.64451 |
| f4/Σ NP | IN12/f | HVT41 | HVT42 | |ODT| | |TDT| |
| 0.28317 | 0.04962 | 0.27270 | 0.55978 | 1.00310 | 0.40309 |
| InTL | HOS | HOS/HOI | InS/HOS | InTL/HOS | Σ TP/InTL |

-continued

| Second embodiment (main reference wavelength: 555 nm) | | | | | |
|---|---|---|---|---|---|
| 1.17472 | 1.85011 | 1.79972 | 0.99277 | 0.63495 | 0.84175 |
| HVT31 | HVT32 | \|InRS41\|/TP4 | \|InRS42\|/TP4 | HVT42/HOI | HVT42/HOS |
| 0.2938 | 0.4785 | 0.25787 | 0.40274 | 0.54453 | 0.30257 |

[Third Embodiment]

Figure 3A:
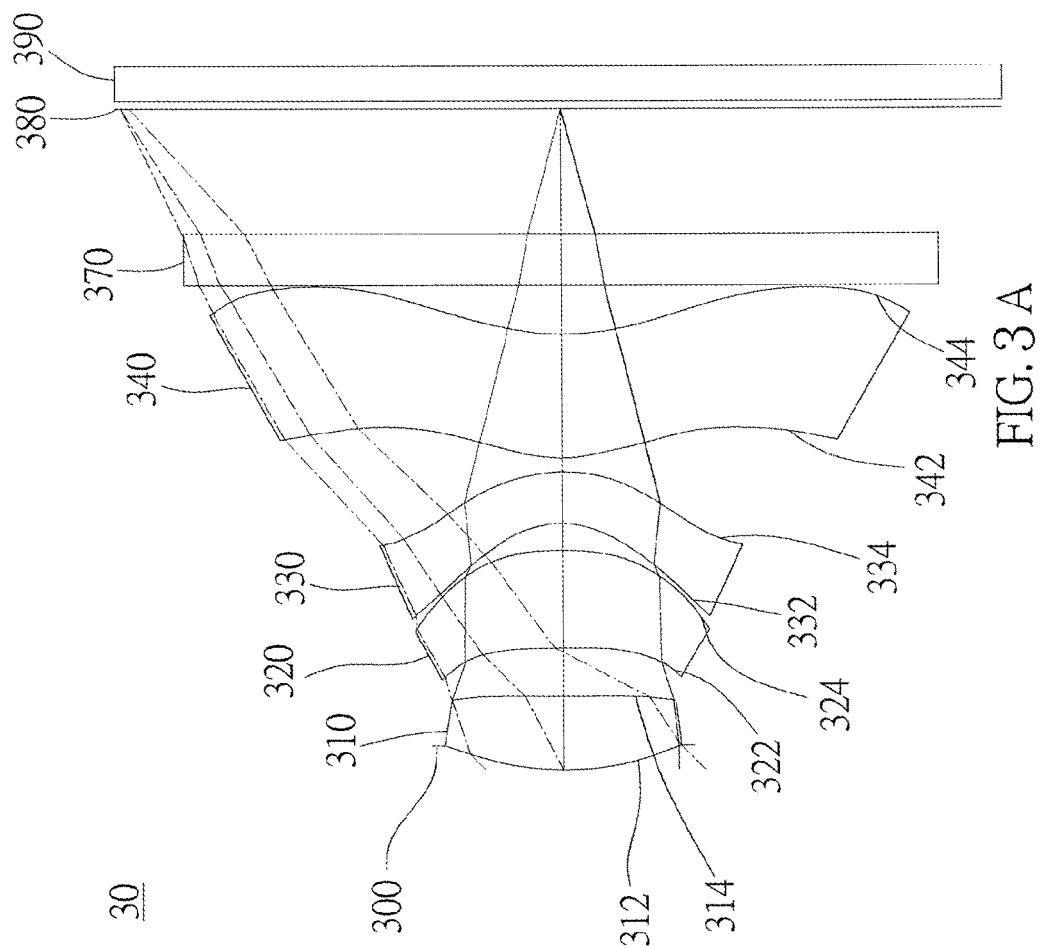
FIG. 3A is a schematic diagram of a third preferred embodiment of the present invention.
Figure 3B:
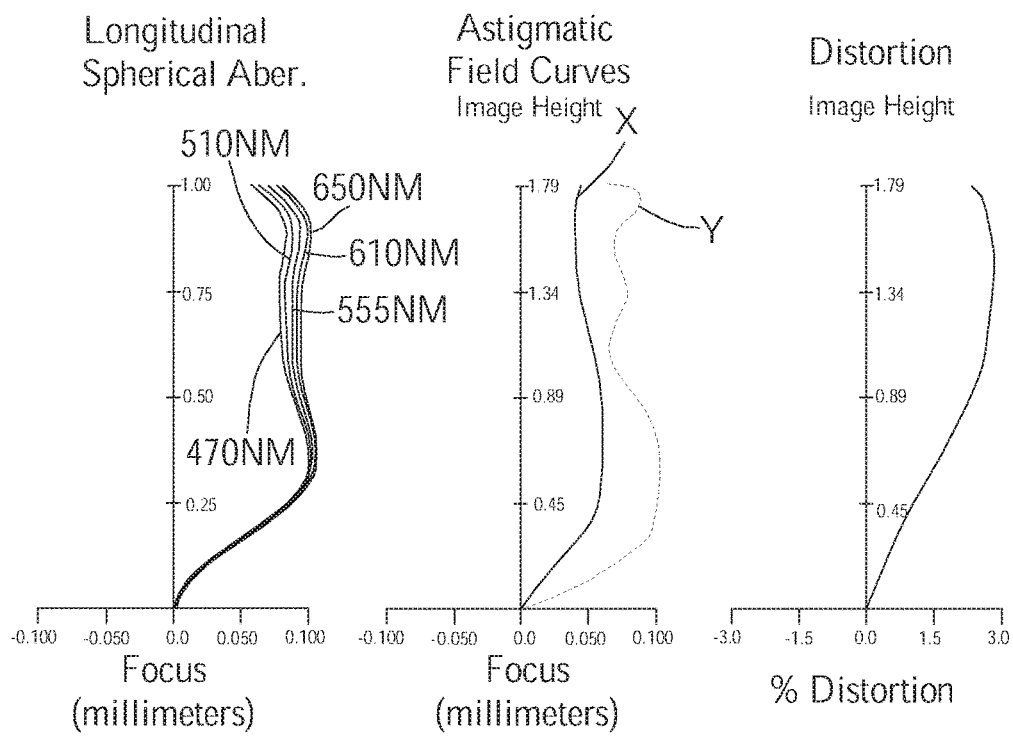
FIG. 3B shows curve diagrams of longitudinal spherical aberration, astigmatic field, and optical distortion of the optical image capturing system in the order from left to right of the third embodiment of the present application.
Figure 3C:
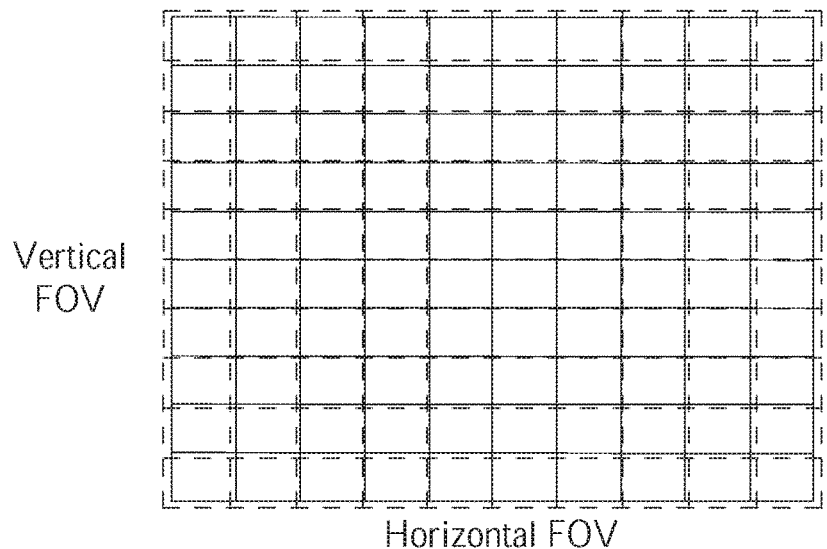
FIG. 3C shows a curve diagram of TV distortion of the optical image capturing system of the third embodiment of the present application.

As shown in FIG. 3A and FIG. 3B, an optical image capturing system of the third preferred embodiment of the present invention includes, along an optical axis from an object side to an image side, an aperture 300, a first lens 310, a second lens 320, a third lens 330, a fourth lens 340, an infrared rays filter 370, an image plane 380, and an image sensor 390.

The first lens 310 has positive refractive power, and is made of plastic. An object-side surface 312 thereof, which faces the object side, is a convex aspheric surface, and an image-side surface 314 thereof, which faces the image side, is a concave aspheric surface, and the object-side surface 312 and the image-side surface 314 both have an inflection point respectively.

The second lens 320 has positive refractive power, and is made of plastic. An object-side surface 322 thereof which faces the object side is a concave aspheric surface, and an image-side surface 324 thereof which faces the image side is a convex aspheric surface.

The third lens 330 has negative refractive power, and is made of plastic. An object-side surface 332, which faces the object side, is a concave aspheric surface, and an image-side surface 334, which faces the image side, is a convex aspheric surface, and the image-side surface 334 has an inflection point.

The fourth lens 340 has a positive refractive power, and is made of plastic. An object-side surface 342, which faces the object side, is a convex aspheric surface, and an image-side surface 344, which faces the image side, is a concave aspheric surface. The object-side surface 342 has two inflection points, while the image-side surface 344 has an inflection point.

The infrared rays filter 370 is made of glass, and between the fourth lens 340 and the image plane 380. The infrared rays filter 370 gives no contribution to the focal length of the system.

The parameters of the lenses of the third preferred embodiment are |f2|+|f3|=3.2561 mm; |f1|+|f4|=4.3895 mm; and |f2|+|f3|<|f1|+|f4|, where f1 is a focal length of the first lens 310; f2 is a focal length of the second lens 320; f3 is a focal length of the third lens 330; and f4 is a focal length of the fourth lens 340.

The optical image capturing system of the third preferred embodiment further satisfies TP3=0.2115 mm and TP4=0.5131 mm, where TP3 is a thickness of the third lens 330 on the optical axis, and TP4 is a thickness of the fourth lens 340 on the optical axis.

The optical image capturing system of the third preferred embodiment further satisfies ΣPP=f1+f2+f4=6.3099 mm and f1/(f1+f2+f4)=0.3720, where ΣPP is a sum of the focal lengths of each positive lens. It is helpful to share the positive refractive power of the first lens 310 to other positive lenses to avoid the significant aberration caused by the incident rays.

The optical image capturing system of the third preferred embodiment further satisfies ΣNP=f3=−1.3357 mm and f3/(f3)=1, where ΣNP is a sum of the focal lengths of each negative lens.

The parameters of the lenses of the third embodiment are listed in Table 5 and Table 6.

TABLE 5

| f = 1.7488 mm; f/HEP = 1.82; HAF = 44.0009 deg; tan(HAF) = 0.9657 | | | | | | |
|---|---|---|---|---|---|---|
| Surface | | Radius of curvature (mm) | Thickness (mm) | Material | Refractive index | Abbe number | Focal length (mm) |
| 0 | Object | plane | 600 | | | | |
| 1 | 1st lens/ Aperture | 1.10194 | 0.30074 | plastic | 1.53460 | 56.04928 | 2.34742 |
| 2 | | 7.99086 | 0.20524 | | | | |
| 3 | 2nd lens | −2.57494 | 0.40303 | plastic | 1.53460 | 56.04928 | 1.92038 |
| 4 | | −0.77590 | 0.11157 | | | | |
| 5 | 3rd lens | −0.33101 | 0.21155 | plastic | 1.64250 | 22.45544 | −1.33567 |
| 6 | | −0.67089 | 0.06000 | | | | |
| 7 | 4th lens | 0.58226 | 0.51306 | plastic | 1.53460 | 56.04928 | 2.04210 |
| 8 | | 0.86075 | 0.20560 | | | | |
| 9 | Filter | plane | 0.21 | BK7_SCHOTT | 1.51680 | 64.13477 | Infinity |
| 10 | | plane | 0.51922 | | | | |
| 11 | Image plane | plane | | | | | |
| 12 | | | | | | | |

Reference wavelength: 555 nm.

The clear aperture of the second surface is 0.45 mm.

TABLE 6

Coefficients of the aspheric surfaces

| Surface | 1 | 2 | 3 | 4 | 5 | 6 | 7 | 8 |
|---|---|---|---|---|---|---|---|---|
| k | −4.11386E+00 | 1.11609E+02 | −1.20457E+01 | −2.60894E+01 | −1.60828E+00 | −3.02168E+00 | −7.36240E+00 | −1.32421E+00 |
| A4 | 6.45604E−02 | −2.79760E−01 | −1.55566E+00 | −2.78890E+00 | 4.87451E+00 | −1.88477E+00 | −4.73940E−01 | −7.69448E−01 |
| A6 | 9.37001E+00 | −1.70772E+00 | 2.22043E+01 | −5.44108E+00 | −9.55485E+01 | 1.08819E+01 | 5.90018E−01 | 1.03816E+00 |
| A8 | −2.08371E+02 | 3.44420E+01 | −4.29093E+02 | 2.44100E+02 | 9.54312E+02 | −7.59696E+01 | −1.09086E+00 | −1.24944E+00 |
| A10 | 2.45407E+03 | −5.70037E+01 | 4.72722E+03 | −2.82690E+03 | −6.36131E+03 | 4.43236E+02 | 1.91543E+00 | 1.15891E+00 |
| A12 | −1.74873E+04 | 3.13103E+02 | −3.37154E+04 | 1.77963E+04 | 2.99146E+04 | −1.53273E+03 | −2.14594E+00 | −7.58232E−01 |
| A14 | 7.67016E+04 | −1.14091E+03 | 1.53196E+05 | −6.60567E+04 | −9.56348E+04 | 3.13152E+03 | 1.44027E+00 | 3.27720E−01 |
| A16 | −2.03736E+05 | 2.44076E+03 | −4.32864E+05 | 1.44067E+05 | 1.94093E+05 | −3.75205E+03 | −5.57990E−01 | −8.76837E−02 |
| A18 | 2.99396E+05 | −2.82699E+03 | 6.99029E+05 | −1.71204E+05 | −2.23641E+05 | 2.43713E+03 | 1.14320E−01 | 1.29417E−02 |
| A20 | −1.86602E+05 | 1.34465E+03 | −4.96564E+05 | 8.55440E+04 | 1.10909E+05 | −6.55460E+02 | −9.18324E−03 | −7.90229E−04 |

An equation of the aspheric surfaces of the third embodiment is the same as that of the first embodiment, and the definitions are the same as well.

The exact parameters of the third embodiment (with main reference wavelength as 555 nm) based on Table 5 and Table 6 are listed in the following table:

| InRS11 | InRS12 | InRS21 | InRS22 | InRS31 | InRS32 |
|---|---|---|---|---|---|
| 0.09255 | −0.01411 | −0.12423 | −0.32720 | −0.38369 | −0.29644 |
| InRS41 | InRS42 | InRSO | InRSI | Σ|InRS| | |
| 0.07620 | 0.09088 | 0.67668 | 0.72863 | 1.40530 | |
| Σ|InRS|/InTL | Σ|InRS|/HOS | (|InRS22| + |InRS31|)/IN23 | | (|InRS32| + |InRS41|)/IN34 | |
| 0.77848 | 0.51288 | 6.3720 | | 6.2106 | |
| (|InRS31| + |InRS32| + |InRS41| + |InRS42|)/InTL | | | (|InRS31| + |InRS32| + |InRS41| + |InRS42|)/HOS | | |
| 0.46932 | | | 0.30920 | | |
| |f/f1| | |f/f2| | |f/f3| | |f/f4| | |f1/f2| | |f2/f3| |
| 0.74498 | 0.91064 | 1.30929 | 0.85636 | 1.22237 | 1.43777 |
| ΣPPR | ΣNPR | ΣPPR/ΣNPR| | ΣPP | ΣNP | f1/ΣPP |
| 2.51199 | 1.30929 | 1.91859 | 1.01175 | 3.96248 | 2.32016 |
| f4/ΣNP | IN12/f | |InRS41|/TP4 | |InRS42|/TP4 | |ODT| | |TDT| |
| 0.51536 | 0.11736 | 0.14853 | 0.17714 | 2.83850 | 0.48954 |
| InTL | HOS | HOS/HOI | InS/HOS | InTL/HOS | ETP/InTL |
| 1.80518 | 2.74000 | 1.52902 | 0.96622 | 0.65882 | 0.79126 |
| HVT31 | HVT32 | HVT41 | HVT42 | HVT42/HOI | HVT42/HOS |
| 0 | 0 | 0.72659 | 1.01863 | 0.56843 | 0.37176 |

[Fourth Embodiment]

Figure 4A:
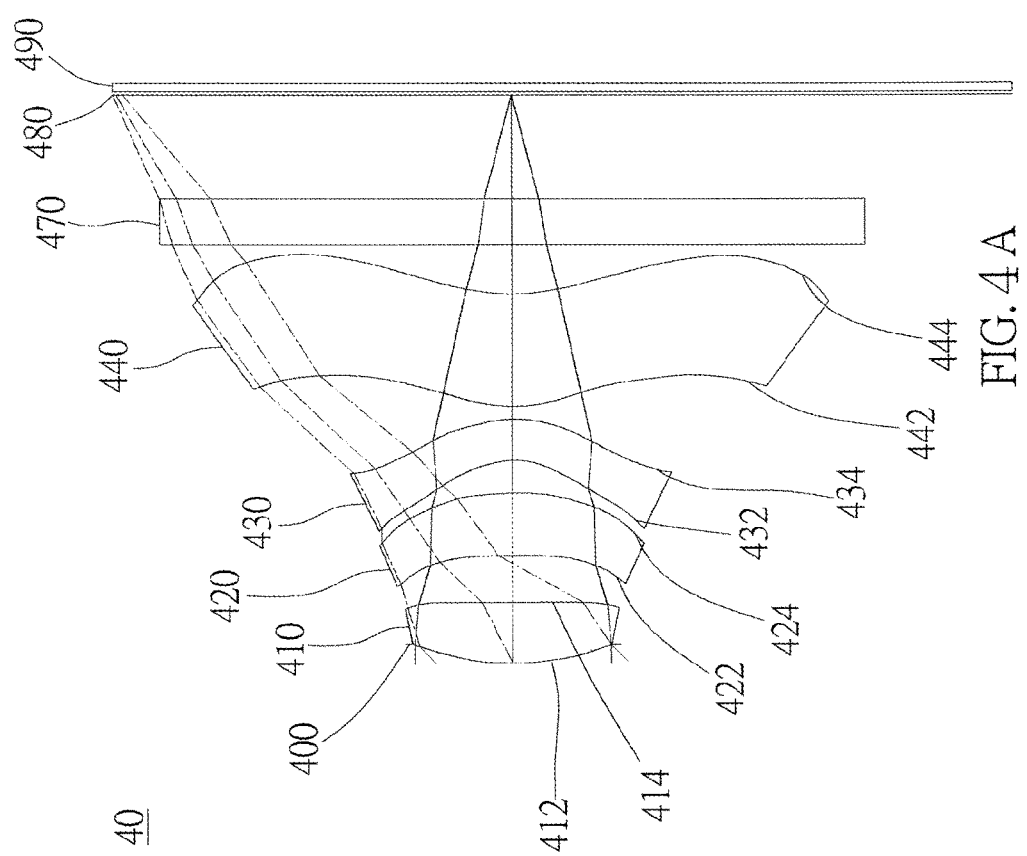
FIG. 4A is a schematic diagram of a fourth preferred embodiment of the present invention.
Figure 4:
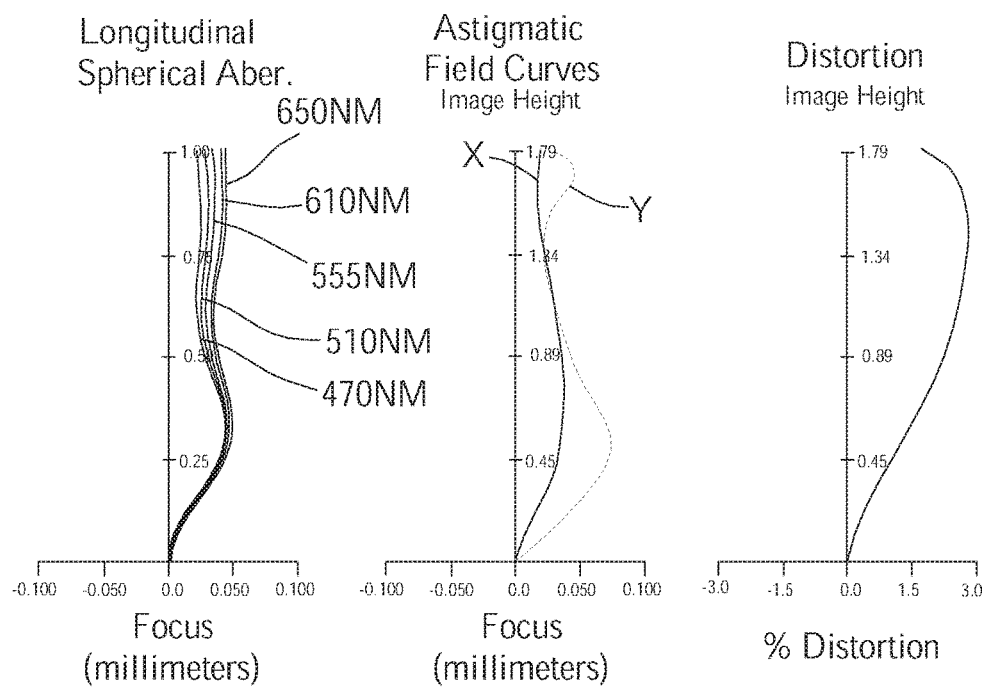
FIG. 4B shows curve diagrams of longitudinal spherical aberration, astigmatic field, and optical distortion of the optical image capturing system in the order from left to right of the fourth embodiment of the present application.
FIG. 4C shows a curve diagram of TV distortion of the optical image capturing system of the fourth embodiment of the present application.
Figure 4:
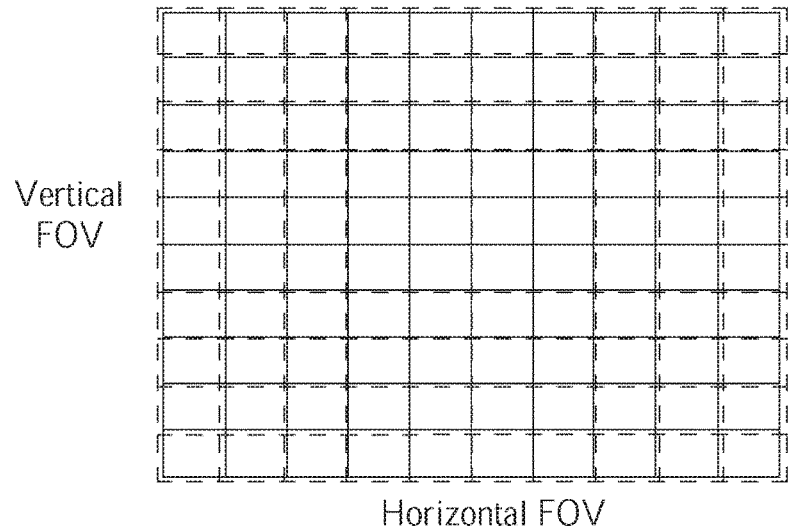

As shown in FIG. 4A and FIG. 4B, an optical image capturing system of the fourth preferred embodiment of the present invention includes, along an optical axis from an object side to an image side, an aperture 400, a first lens 410, a second lens 420, a third lens 430, a fourth lens 440, an infrared rays filter 470, an image plane 480, and an image sensor 490.

The first lens 410 has positive refractive power, and is made of plastic. An object-side surface 412 thereof, which faces the object side, is a convex aspheric surface, and an image-side surface 414 thereof, which faces the image side, is a concave aspheric surface, and each of them has an inflection point respectively.

The second lens 420 has positive refractive power, and is made of plastic. An object-side surface thereof, which faces the object side, is a concave aspheric surface, and an image-side surface thereof, which faces the image side, is a convex aspheric surface.

The third lens 430 has negative refractive power, and is made of plastic. An object-side surface 432, which faces the object side, is a concave aspheric surface, and an image-side surface 434, which faces the image side, is a convex aspheric surface. The object-side surface 432 has two inflection points, while the image-side surface 434 has an inflection point.

The fourth lens 440 has positive refractive power, and is made of plastic. An object-side surface 442, which faces the object side, is a convex aspheric surface, and an image-side surface 444, which faces the image side, is a concave aspheric surface. The object-side surface 442 and the image-side surface 444 both have an inflection point respectively.

The infrared rays filter 470 is made of glass, and between the fourth lens 440 and the image plane 480. The infrared rays filter 470 gives no contribution to the focal length of the system.

The optical image capturing system of the fourth preferred embodiment has the following parameters, which are |f2|+|f3|=4.3448 mm; |f1|+|f4|=3.9627 mm; and |f2|+|f3|>|f1|+|f4|, where f1 is a focal length of the first lens 410; f2 is a focal length of the second lens 420; f3 is a focal length of the third lens 430; and f4 is a focal length of the fourth lens 440.

The optical image capturing system of the fourth preferred embodiment further satisfies TP3=0.1900 mm and TP4=0.5171 mm, where TP3 is a thickness of the third lens on the optical axis, and TP4 is a thickness of the fourth lens on the optical axis.

In the fourth embodiment, the optical image capturing system of the fourth preferred embodiment further satisfies ΣPP=f1+f2+f4=6.9824 mm and f1/(f1+f2+f4)=0.3392, where ΣPP is a sum of the focal lengths of each positive lens. It is helpful to share the positive refractive power of the first lens 410 to other positive lenses to avoid the significant aberration caused by the incident rays.

The optical image capturing system of the fourth preferred embodiment further satisfies ΣNP=f3=−1.3251 mm and f3/(f3)=1, where ΣNP is a sum of the focal lengths of each negative lens.

The parameters of the lenses of the fourth embodiment are listed in Table 7 and Table 8.

TABLE 7 f = 1.7995 mm; f/HEP = 2.037; HAF = 44.0013 deg; tan(HAF) = 0.9657

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1$^{st}$ lens/ Aperture | 1.06261 | 0.27856 | plastic | 1.535 | 56.05 | 2.368 |
| 2 | | 5.90448 | 0.21824 | | | | |
| 3 | 2$^{nd}$ lens | −3.07258 | 0.28878 | plastic | 1.535 | 56.05 | 3.020 |
| 4 | | −1.09535 | 0.14992 | | | | |
| 5 | 3$^{rd}$ lens | −0.34003 | 0.19000 | plastic | 1.642 | 22.46 | −1.325 |
| 6 | | −0.68687 | 0.06000 | | | | |
| 7 | 4$^{th}$ lens | 0.52196 | 0.51706 | plastic | 1.535 | 56.05 | 1.594 |
| 8 | | 0.87651 | 0.22691 | | | | |
| 9 | Filter | plane | 0.21 | BK7_SCHOTT | 1.517 | 64.13 | Infinity |
| 10 | | plane | 0.48809 | | | | |
| 11 | Image plane | plane | | | | | |
| 12 | | | | | | | |

Reference wavelength: 555 nm.
The clear aperture of the second surface is 0.477 mm.

TABLE 8

Coefficients of the aspheric surfaces

| Surface | 1 | 2 | 3 | 4 | 5 | 6 | 7 | 8 |
|---|---|---|---|---|---|---|---|---|
| k | −4.11386E+00 | 1.11609E+02 | −1.20457E+01 | −2.60894E+01 | −1.60828E+00 | −3.02168E+00 | −6.90987E+00 | −1.16395E+00 |
| A4 | 1.89663E−01 | −4.42882E−01 | −1.64918E+00 | −1.26975E+00 | 5.72303E+00 | −1.58295E+00 | −4.49130E−01 | −8.19241E−01 |
| A6 | 7.83824E+00 | −1.24645E+00 | 2.35185E+01 | −1.36831E+01 | 9.42979E+01 | 1.00231E+01 | 5.93576E−01 | 1.06732E+00 |
| A8 | −2.01070E+02 | −3.10954E−01 | −4.45396E+02 | 2.85720E+02 | 9.49136E+02 | −7.13304E+01 | −1.09774E+00 | −1.26303E+00 |
| A10 | 2.43526E+03 | −5.27607E+01 | 4.79314E+03 | −2.93450E+03 | 6.37753E+03 | 4.33436E+02 | 1.90775E+00 | 1.15763E+00 |
| A12 | −1.74872E+04 | 3.13009E+02 | −3.37154E+04 | 1.78985E+04 | 2.99953E+04 | −1.52494E+03 | −2.14594E+00 | −7.56626E−01 |
| A14 | 7.67016E+04 | −1.14091E+03 | 1.53196E+05 | −6.60525E+04 | 9.57659E+04 | 3.12107E+03 | 1.44027E+00 | 3.28469E−01 |
| A16 | −2.03736E+05 | 2.44076E+03 | −4.32864E+05 | 1.44068E+05 | 1.94093E+05 | −3.73817E+03 | −5.57990E−01 | −8.82160E−02 |
| A18 | 2.99396E+05 | −2.82699E+03 | 6.99029E+05 | −1.71204E+05 | −2.23641E+05 | 2.43713E+03 | 1.14320E−01 | 1.29417E−02 |
| A20 | −1.86602E+05 | 1.34465E+03 | −4.96564E+05 | 8.55440E+04 | 1.10909E+05 | −6.55460E+02 | −9.18324E−03 | −7.90229E−04 |

An equation of the aspheric surfaces of the fourth embodiment is the same as that of the first embodiment, and the definitions are the same as well.

The exact parameters of the fourth embodiment (with main reference wavelength as 555 nm) based on Table 7 and Table 8 are listed in the following table:

| Fourth embodiment (main reference wavelength: 555 nm) | | | | | |
|---|---|---|---|---|---|
| InRS11 | InRS12 | InRS21 | InRS22 | InRS31 | InRS32 |
| 0.08569 | −0.02436 | −0.13024 | −0.23075 | −0.31306 | −0.24465 |
| InRS41 | InRS42 | InRSO | InRSI | Σ\|InRS\| | |
| 0.09386 | −0.02821 | 0.62285 | 0.52797 | 1.15082 | |
| Σ\|InRS\|/InTL | Σ\|InRS\|/HOS | (\|InRS22\| + \|InRS31\|)/IN23 | | (\|InRS32\| + \|InRS41\|)/IN34 | |
| 0.67594 | 0.43798 | 3.6273 | | 5.6419 | |
| (\|InRS31\| + \|InRS32\| + \|InRS41\| + \|InRS42\|)/InTL | | (\|InRS31\| + \|InRS32\| + \|InRS41\| + \|InRS42\|)/HOS | | | |
| 0.39927 | | | | 0.25871 | |
| \|f/f1\| | \|f/f2\| | \|f/f3\| | \|f/f4\| | \|f1/f2\| | \|f2/f3\| |
| 0.75976 | 0.59591 | 1.35802 | 0.78434 | 1.27873 | 2.27888 |
| ΣPPR | ΣNPR | ΣPPR/\|ΣNPR\| | ΣPP | ΣNP | f1/ΣPP |
| 2.48440 | 1.35802 | 1.82943 | 1.04339 | 4.61393 | 2.26997 |
| f4/ΣNP | IN12/f | \|InRS41\|/TP4 | \|InRS42\|/TP4 | \|ODT\| | \|TDT\| |
| 0.34553 | 0.12128 | 0.18153 | 0.05456 | 2.77932 | 1.07666 |
| InTL | HOS | HOS/HOI | InS/HOS | InTL/HOS | ETP/InTL |
| 1.70256 | 2.62756 | 1.46627 | 0.96739 | 0.64796 | 0.74852 |
| HVT31 | HVT32 | HVT41 | HVT42 | HVT42/HOI | HVT42/HOS |
| 0 | 0.7088 | 0.78677 | 0.96171 | 0.53667 | 0.36601 |

[Fifth Embodiment]

Figure 5:
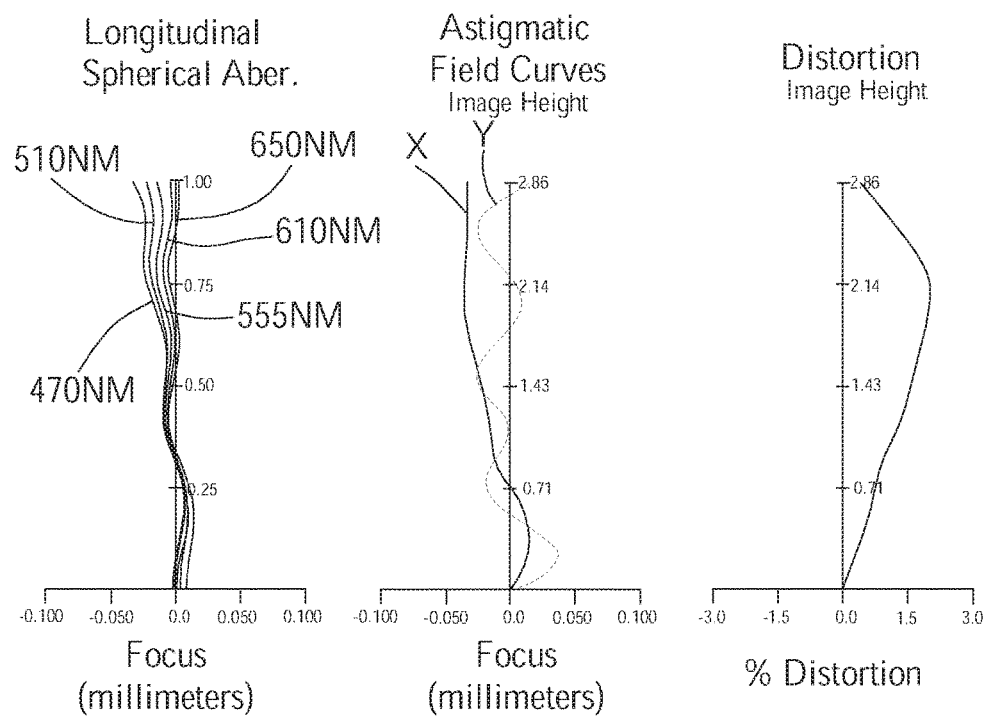
FIG. 5A is a schematic diagram of a fifth preferred embodiment of the present invention.
FIG. 5B shows curve diagrams of longitudinal spherical aberration, astigmatic field, and optical distortion of the optical image capturing system in the order from left to right of the fifth embodiment of the present application.
FIG. 5C shows a curve diagram of TV distortion of the optical image capturing system of the fifth embodiment of the present application.
Figure 5:
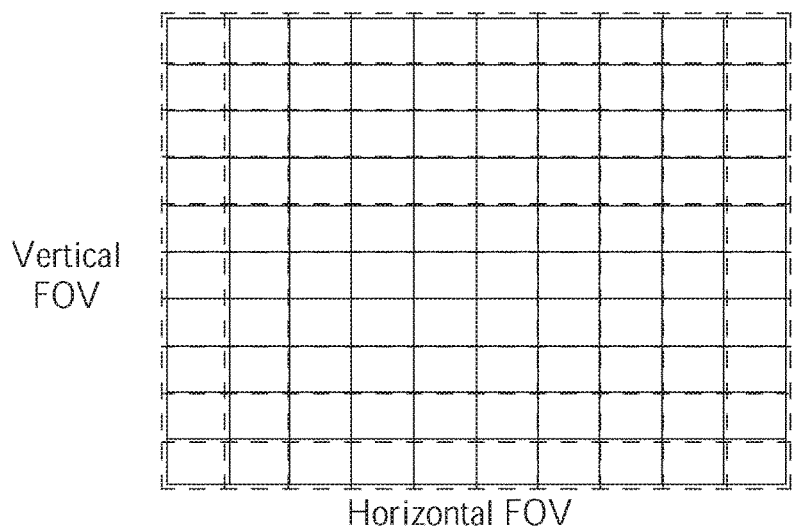

As shown in FIG. 5A and FIG. 5B, an optical image capturing system of the fifth preferred embodiment of the present invention includes, along an optical axis from an object side to an image side, an aperture 500, a first lens 510, a second lens 520, a third lens 530, a fourth lens 540, an infrared rays filter 570, an image plane 580, and an image sensor 590.

The first lens 510 has positive refractive power, and is made of plastic. An object-side surface 512 thereof which faces the object side is a convex aspheric surface, and an image-side surface 514 thereof which faces the image side is a concave aspheric surface, wherein the object-side surface 512 and the image-side surface 514 both have an inflection point respectively.

The second lens 520 has positive refractive power, and is made of plastic. An object-side surface 522 thereof, which faces the object side, is a concave aspheric surface, and an image-side surface 524 thereof, which faces the image side, is a convex aspheric surface.

The third lens 530 has negative refractive power, and is made of plastic. An object-side surface 532, which faces the object side, is a concave aspheric surface, and an image-side surface 534, which faces the image side, is a convex aspheric surface. The image-side surface 534 has an inflection point.

The fourth lens 540 has a positive refractive power, and is made of plastic. An object-side surface 542, which faces the object side, is a convex aspheric surface, and an image-side surface 544, which faces the image side, is a concave aspheric surface. The object-side surface 542 has two inflection points, while the image-side surface 544 has an inflection point.

The infrared rays filter 570 is made of glass, and between the fourth lens 540 and the image plane 580. The infrared rays filter 570 gives no contribution to the focal length of the system.

The optical image capturing system of the fifth preferred embodiment further satisfies TP3=0.3996 mm and TP4=0.9713 mm, where TP3 is a thickness of the third lens 530 on the optical axis, and TP4 is a thickness of the fourth lens 540 on the optical axis.

The optical image capturing system of the fifth preferred embodiment further satisfies $\Sigma PP = f1+f2+f4 = 13.1419$ mm and $f1/(f1+f2+f4) = 0.2525$, where $\Sigma PP$ is a sum of the focal lengths of each positive lens. It is helpful to share the positive refractive power of the first lens 510 to other positive lenses to avoid the significant aberration caused by the incident rays.

The optical image capturing system of the fifth preferred embodiment further satisfies $\Sigma NP = f3 = -2.3127$ mm; and $f3/(f3) = 1$, where $\Sigma NP$ is a sum of the focal lengths of each negative lens.

The parameters of the lenses of the fifth embodiment are listed in Table 9 and Table 10.

TABLE 9 f = 3.4320 mm; f/HEP = 2.28; HAF = 39.5498 deg; tan(HAF) = 0.8258

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1$^{st}$ lens/ Aperture | 1.50982 | 0.61808 | plastic | 1.53460 | 56.04928 | 3.31779 |
| 2 | | 8.53969 | 0.32873 | | | | |
| 3 | 2$^{nd}$ lens | −6.01490 | 0.35414 | plastic | 1.53460 | 56.04928 | 5.35759 |
| 4 | | −1.98450 | 0.11553 | | | | |
| 5 | 3rd lens | −1.05901 | 0.39958 | plastic | 1.64250 | 22.45544 | −2.31270 |
| 6 | | −4.15119 | 0.20863 | | | | |
| 7 | 4$^{th}$ lens | 1.15231 | 0.97132 | plastic | 1.53460 | 56.04928 | 4.46650 |
| 8 | | 1.56696 | 0.17398 | | | | |
| 9 | Filter | plane | 0.61 | BK_7 | 1.51680 | 64.13477 | |
| 10 | | plane | 0.67 | | | | |
| 11 | Image plane | plane | | | | | |
| 12 | | | | | | | |

Reference wavelength: 555 nm.
The clear aperture of the third surface is 0.72 mm.

TABLE 10

Coefficients of the aspheric surfaces

| Surface | 1 | 2 | 3 | 4 | 5 | 6 | 7 | 8 |
|---|---|---|---|---|---|---|---|---|
| k | 1.91608E+00 | −9.90000E+01 | 3.12661E+01 | −7.96538E+00 | −8.30362E−01 | −6.96585E+00 | −1.18798E+01 | −7.01760E−01 |
| A4 | −1.04983E−01 | −7.00916E−02 | −1.45169E−01 | −4.53803E−01 | −5.41253E−01 | −1.20350E+00 | −4.13567E−01 | −2.64281E−01 |
| A6 | 5.81412E−01 | 1.32838E−01 | 6.30379E−01 | 1.53028E+00 | 2.79171E+00 | 3.66683E+00 | 2.54369E−01 | 1.37894E−01 |
| A8 | −6.71811E+00 | −9.11601E−01 | −1.13291E+01 | −1.23692E+01 | −1.51326E+01 | −8.89633E+00 | −2.66026E−03 | −6.37186E−02 |
| A10 | 3.53193E+01 | 7.64045E−01 | 6.80561E+01 | 4.61028E+01 | 5.13829E+01 | 1.65534E+01 | −1.50320E−01 | 2.24580E−02 |
| A12 | −1.10122E+02 | 3.05178E+00 | −2.37992E+02 | −9.64720E+01 | −9.52092E+01 | −2.06411E+01 | 1.19574E−01 | −6.02309E−03 |
| A14 | 2.06492E+02 | −9.34726E+00 | 4.98312E+02 | 1.17099E+02 | 9.23444E+01 | 1.65593E+01 | −4.20365E−02 | 1.12736E−03 |
| A16 | −2.29728E+02 | 8.04581E+00 | −6.30979E+02 | −7.95639E+01 | −3.38893E+01 | −8.18699E+00 | 7.84666E−03 | −1.32311E−04 |
| A18 | 1.38592E+02 | −1.22151E+00 | 4.48459E+02 | 2.63131E+01 | −1.04010E+01 | 2.27325E+00 | −7.49829E−04 | 8.32178E−06 |
| A20 | −3.50697E+01 | 1.40638E−01 | −1.38023E+02 | −3.19378E+00 | 8.37135E+00 | −2.71850E−01 | 2.89993E−05 | −2.16110E−07 |

The parameters of the lenses of the fifth preferred embodiment are $|f2|+|f3|=7.6703$ mm; $|f1|+|f4|=7.7843$ mm; and $|f2|+|f3|>|f1|+|f4|$, where f1 is a focal length of the first lens 510; f2 is a focal length of the second lens 520; f3 is a focal length of the third lens 530; and f4 is a focal length of the fourth lens 540.

An equation of the aspheric surfaces of the fifth embodiment is the same as that of the first embodiment, and the definitions are the same as well.

The exact parameters of the fifth embodiment (with main reference wavelength as 555 nm) based on Table 9 and Table 10 are listed in the following table:

| Fifth embodiment (main reference wavelength: 555nm) | | | | | |
|---|---|---|---|---|---|
| InRS11 | InRS12 | InRS21 | InRS22 | InRS31 | InRS32 |
| 0.19256 | −0.01037 | −0.14846 | −0.33742 | −0.36837 | −0.25666 |
| InRS41 | InRS42 | InRSO | InRSI | Σ\|InRS\| | |
| −0.19362 | −0.25529 | 0.90301 | 0.85974 | 1.76275 | |
| Σ\|InRS\|/InTL | Σ\|InRS\|/HOS | (\|InRS22\| + \|InRS31\|)/IN23 | | (\|InRS32\| + \|InRS41\|)/IN34 | |
| 0.58836 | 0.39612 | 6.1091 | | 2.1582 | |
| (\|InRS31\| + \|InRS32\| + \|InRS41\| + \|InRS42\|)/InTL | | (\|InRS31\| + \|InRS32\| + \|InRS41\| + \|InRS42\|)/HOS | | | |
| | 0.35846 | | | 0.24134 | |
| \|f/f1\| | \|f/f2\| | \|f/f3\| | \|f/f4\| | \|f1/f2\| | \|f2/f3\| |
| 1.03444 | 0.64059 | 1.48400 | 0.76840 | 0.61927 | 2.31660 |
| ΣPPR | ΣNPR | ΣPPR/\|ΣNPR\| | ΣPP | ΣNP | f1/ΣPP |
| 2.44343 | 1.48400 | 1.64652 | 1.00509 | 9.82409 | 3.30099 |
| f4/ΣNP | IN12/f | \|InRS41\|/TP4 | \|InRS42\|/TP4 | \|ODT\| | \|TDT\| |
| 0.45465 | 0.09578 | 0.19933 | 0.26283 | 2.01839 | 1.61834 |
| InTL | HOS | HOS/HOI | InS/HOS | InTL/HOS | ETP/InTL |
| 2.99601 | 4.44999 | 1.55812 | 0.95673 | 0.67326 | 0.78208 |
| HVT31 | HVT32 | HVT41 | HVT42 | HVT42/HOI | HVT42/HOS |
| 0 | 1.0084 | 0.61419 | 1.21734 | 0.42624 | 0.27356 |

[Sixth Embodiment]

Figure 6:
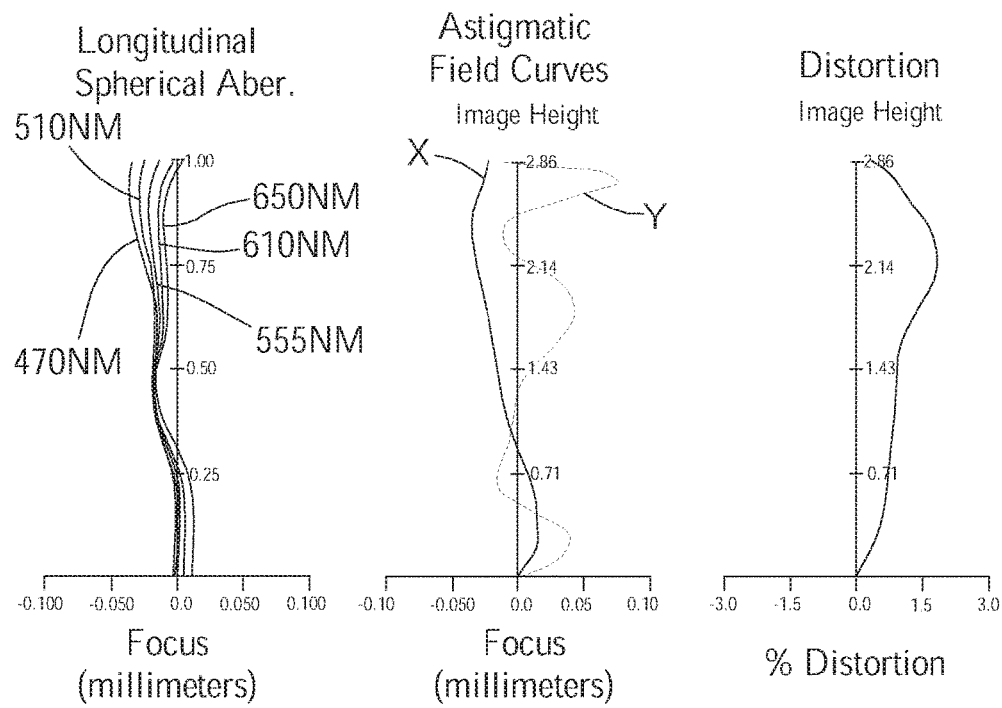
FIG. 6A is a schematic diagram of a sixth preferred embodiment of the present invention.
FIG. 6B shows curve diagrams of longitudinal spherical aberration, astigmatic field, and optical distortion of the optical image capturing system in the order from left to right of the sixth embodiment of the present application.
FIG. 6C shows a curve diagram of TV distortion of the optical image capturing system of the sixth embodiment of the present application.
Figure 6:
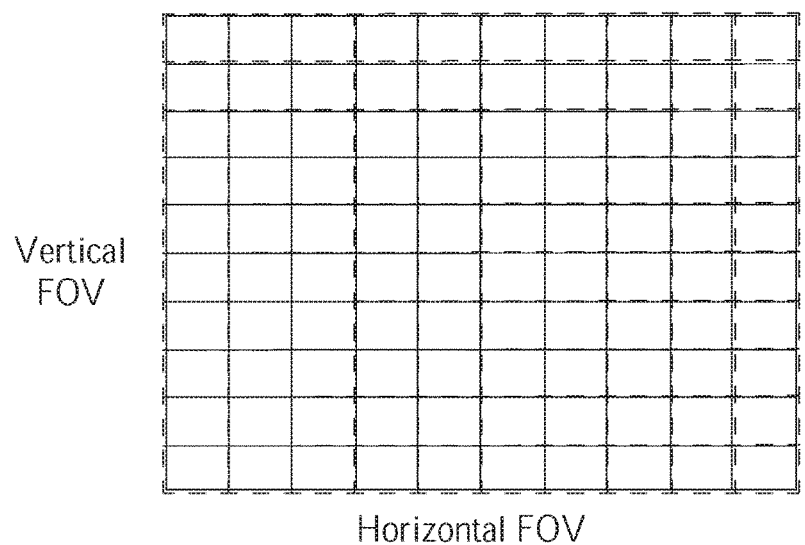

As shown in FIG. 6A and FIG. 6B, an optical image capturing system of the sixth preferred embodiment of the present invention includes, along an optical axis from an object side to an image side, an aperture 600, a first lens 610, a second lens 620, a third lens 630, a fourth lens 640, an infrared rays filter 670, an image plane 680, and an image sensor 690.

The first lens 610 has positive refractive power, and is made of plastic. An object-side surface 612 thereof which faces the object side is a convex aspheric surface, and an image-side surface 614 thereof which faces the image side is a concave aspheric surfaces. The object-side surface 612 and the image-side surface 614 both have an inflection point respectively.

The second lens 620 has positive refractive power, and is made of plastic. An object-side surface 622 thereof which faces the object side is a concave aspheric surface, and an image-side surface 624 thereof which faces the image side is a convex aspheric surface.

The third lens 630 has negative refractive power, and is made of plastic. An object-side surface 632, which faces the object side, is a concave aspheric surface, and an image-side surface 634, which faces the image side, is a convex aspheric surface. The object-side surface 632 has two inflection points, while the image-side surface 634 has an inflection point.

The fourth lens 640 has positive refractive power, and is made of plastic. An object-side surface 642, which faces the object side, is a convex aspheric surface, and an image-side surface 644, which faces the image side, is a concave aspheric surface, and the object-side surface 642 has two inflection points, while the image-side surface 644 has an inflection point.

The infrared rays filter 670 is made of glass, and between the fourth lens 640 and the image plane 680. The infrared rays filter 670 gives no contribution to the focal length of the system.

The optical image capturing system of the sixth preferred embodiment has the following parameters, which are |f2|+|f3|=5.7804 mm; If |f1|+|f4|=8.0922 mm; and |f2|+|f3|<|f1|+|f4|.

The optical image capturing system of the sixth preferred embodiment further satisfies TP3=0.5226 mm and TP4=0.8727 mm, where TP3 is a thickness of the third lens on the optical axis, and TP4 is a thickness of the fourth lens on the optical axis.

The optical image capturing system of the sixth preferred embodiment further satisfies ΣPP=f1+f2+f4=11.8154 mm and f1/(f1+f2+f4)=0.2908, where ΣPP is a sum of the focal lengths of each positive lens. It is helpful to share the positive refractive power of the first lens 610 to other positive lenses to avoid the significant aberration caused by the incident rays.

The optical image capturing system of the sixth preferred embodiment further satisfies ΣNP=f3=−2.0572 mm and f3/(f3)=1, where ΣNP is a sum of the focal lengths of each negative lens.

The parameters of the lenses of the sixth embodiment are listed in Table 11 and Table 12.

TABLE 11

| f = 3.4357 mm; f/HEP = 2.441; HAF = 39.5499 deg; tan(HAF) = 0.8258 | | | | | | |
|---|---|---|---|---|---|---|
| Surface | | Radius of curvature (mm) | Thickness (mm) | Material | Refractive index | Abbe number | Focal length (mm) |
| 0 | Object | plane | 600 | | | | |
| 1 | 1st lens/ Aperture | 1.37505 | 0.39474 | plastic | 1.53460 | 56.04928 | 3.43574 |
| 2 | | 4.87501 | 0.48225 | | | | |
| 3 | 2nd lens | −5.64751 | 0.36141 | plastic | 1.53460 | 56.04928 | 3.72326 |
| 4 | | −1.50824 | 0.13838 | | | | |
| 5 | 3rd lens | −0.89310 | 0.52263 | plastic | 1.64250 | 22.45544 | −2.05715 |
| 6 | | −3.33251 | 0.22392 | | | | |
| 7 | 4th lens | 1.05425 | 0.87270 | plastic | 1.53460 | 56.04928 | 4.65641 |
| 8 | | 1.29716 | 0.17398 | | | | |
| 9 | Filter | plane | 0.61 | BK_7 | 1.51680 | 64.13477 | |
| 10 | | plane | 0.67 | | | | |

TABLE 11-continued f = 3.4357 mm; f/HEP = 2.441; HAF = 39.5499 deg; tan(HAF) = 0.8258

| Surface | | Radius of curvature (mm) | Thickness (mm) | Material | Refractive index | Abbe number | Focal length (mm) |
|---|---|---|---|---|---|---|---|
| 11 | Image plane | plane | | | | | |
| 12 | | | | | | | |

Reference wavelength: 555 nm.
The clear aperture of the fifth surface is 0.84291 mm.

TABLE 12

Coefficients of the aspheric surfaces

| Surface | 1 | 2 | 3 | 4 | 5 | 6 | 7 | 8 |
|---|---|---|---|---|---|---|---|---|
| k | 8.09170E−01 | 3.53697E+01 | 3.24901E+01 | −6.13868E+00 | −2.34427E−01 | −6.13591E+00 | −9.87167E+00 | −4.83890E+00 |
| A4 | −4.43062E−02 | −6.29081E−02 | −1.48904E−01 | −5.55294E−01 | −3.33293E−01 | −1.18661E+00 | −4.76987E−01 | −1.93095E−01 |
| A6 | 4.60275E−01 | −1.10186E−01 | 4.50578E−01 | 1.99199E+00 | 2.95033E+00 | 3.67935E+00 | 3.20089E−01 | 1.26435E−01 |
| A8 | −6.08161E+00 | 2.01953E−01 | −1.07366E+01 | −1.30027E+01 | −1.47850E+01 | −8.96834E+00 | 1.05767E−03 | −6.18637E−02 |
| A10 | 3.48125E+01 | −1.63820E+00 | 6.66110E+01 | 4.62836E+01 | 5.10227E+01 | 1.65676E+01 | −1.59616E−01 | 2.26025E−02 |
| A12 | −1.13221E+02 | 3.15908E+00 | −2.40552E+02 | −9.50780E−01 | −9.61802E−01 | −2.05674E+01 | 1.19574E−01 | −6.08902E−03 |
| A14 | 2.15144E+02 | −3.48735E+00 | 5.12952E+02 | 1.14955E+02 | 9.39723E+01 | 1.64749E+01 | −4.20365E−02 | 1.12005E−03 |
| A16 | −2.36436E+02 | 1.48079E+00 | −6.45513E+02 | −7.88321E+01 | −3.45958E+01 | −8.16248E+00 | 7.84666E−03 | −1.29548E−04 |
| A18 | 1.38592E+02 | −1.22151E+00 | 4.48459E+02 | 2.63131E+01 | −1.04010E+01 | 2.27325E+00 | −7.49829E−04 | 8.32178E−06 |
| A20 | −3.50697E+01 | 1.40638E−01 | −1.38023E+02 | −3.19378E+00 | 8.37135E+00 | −2.71850E−01 | 2.89993E−05 | −2.16110E−07 |

An equation of the aspheric surfaces of the sixth embodiment is the same as that of the first embodiment, and the definitions are the same as well.

The exact parameters of the sixth embodiment (with main reference wavelength as 555 nm) based on Table 11 and Table 12 are listed in the following table:

| Sixth embodiment (main reference wavelength: 555 nm) | | | | | |
|---|---|---|---|---|---|
| InRS11 | InRS12 | InRS21 | InRS22 | InRS31 | InRS32 |
| 0.19070 | 0.02842 | −0.16242 | −0.36086 | −0.38418 | −0.31651 |
| InRS41 | InRS42 | InRSO | InRSI | Σ\|InRS\| | |
| −0.17292 | −0.18713 | 0.91021 | 0.89292 | 1.80313 | |
| Σ\|InRS\|/InTL | Σ\|InRS\|/HOS | (\|InRS22\| + \|InRS31\|)/IN23 | | (\|InRS32\| + \|InRS41\|)/IN34 | |
| 0.60184 | 0.40520 | 5.3842 | | 2.1857 | |
| (\|InRS31\| + \|InRS32\| + \|InRS41\| + \|InRS42\|)/InTL | | | (\|InRS31\| + \|InRS32\| + \|InRS41\| + \|InRS42\|)/HOS | | |
| | 0.35405 | | | 0.23837 | |
| \|f/f1\| | \|f/f2\| | \|f/f3\| | \|f/f4\| | \|f1/f2\| | \|f2/f3\| |
| 0.99999 | 0.92277 | 1.67013 | 0.73784 | 0.92278 | 1.80991 |
| ΣPPR | ΣNPR | ΣPPR/\|ΣNPR\| | ΣPP | ΣNP | f1/ΣPP |
| 2.66060 | 1.67013 | 1.59305 | 1.37859 | 8.37967 | 2.49221 |
| f4/ΣNP | IN12/f | \|InRS41\|/TP4 | \|InRS42\|/TP4 | \|ODT\| | \|TDT\| |
| 0.55568 | 0.14037 | 0.19814 | 0.21443 | 1.87598 | 1.47595 |
| InTL | HOS | HOS/HOI | InS/HOS | InTL/HOS | ΣTP/InTL |
| 2.99602 | 4.45000 | 1.55812 | 0.95715 | 0.67326 | 0.71811 |
| HVT31 | HVT32 | HVT41 | HVT42 | HVT42/HOI | HVT42/HOS |
| 0 | 1.1365 | 0.61754 | 1.17747 | 0.41228 | 0.26460 |

[Seventh Embodiment]

Figure 7A:
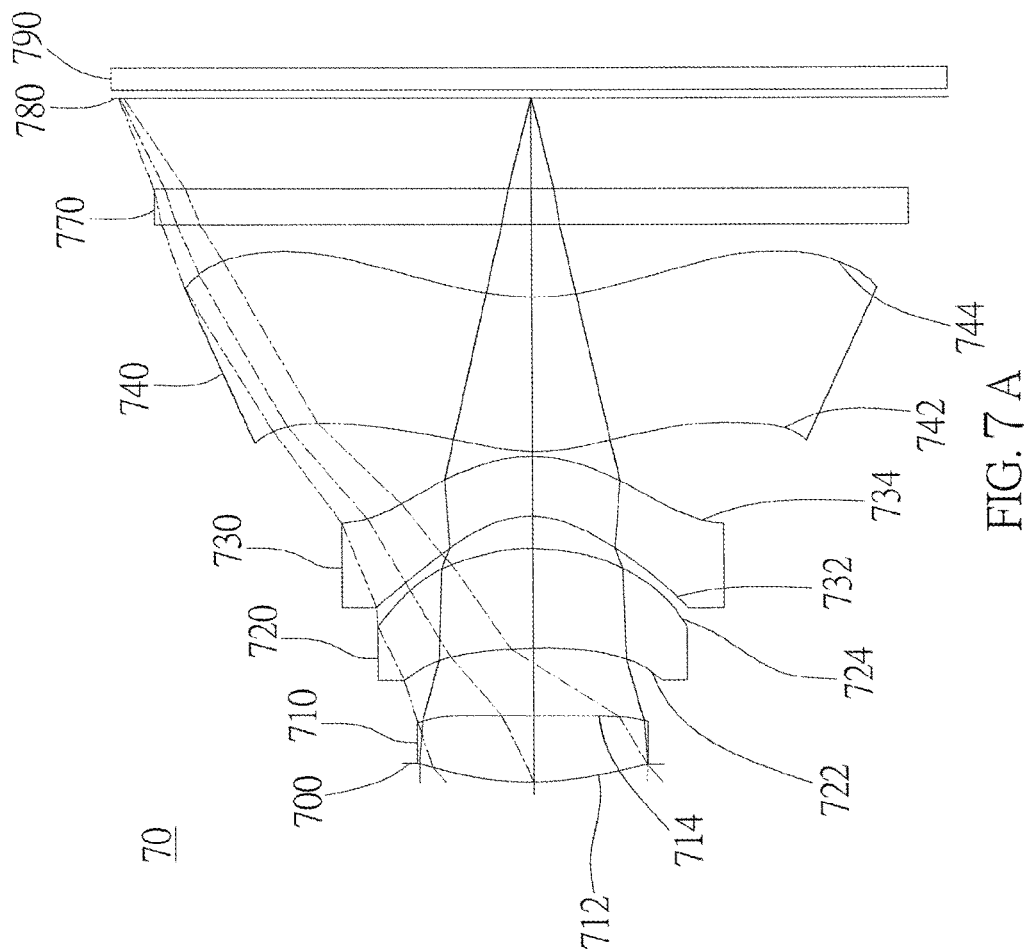
FIG. 7A is a schematic diagram of a seventh preferred embodiment of the present invention.
Figure 7B:
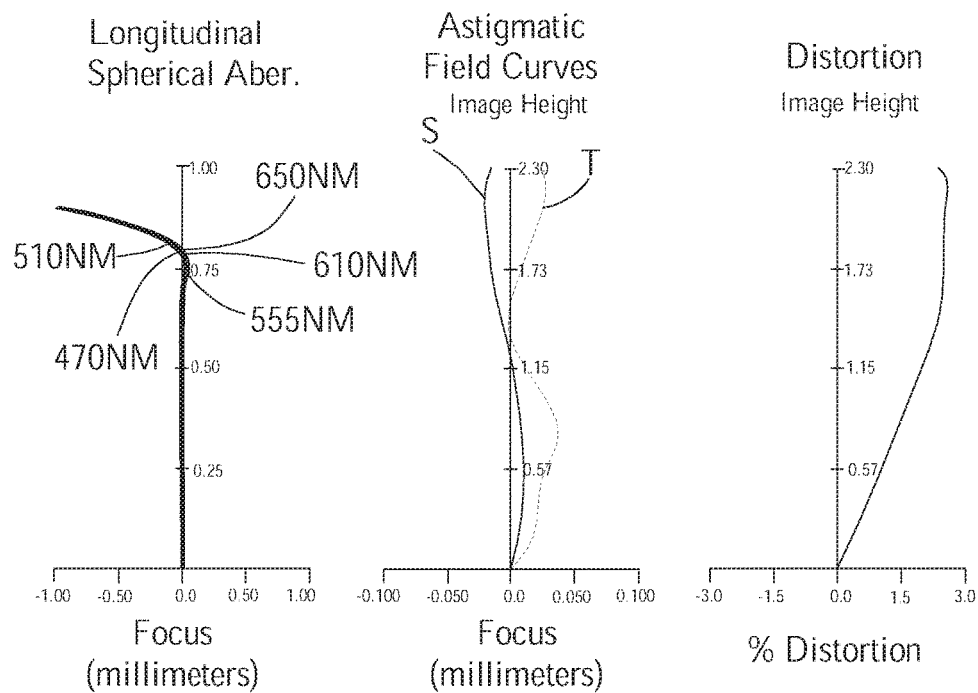
FIG. 7B shows curve diagrams of longitudinal spherical aberration, astigmatic field, and optical distortion of the optical image capturing system in the order from left to right of the seventh embodiment of the present application.
Figure 7C:
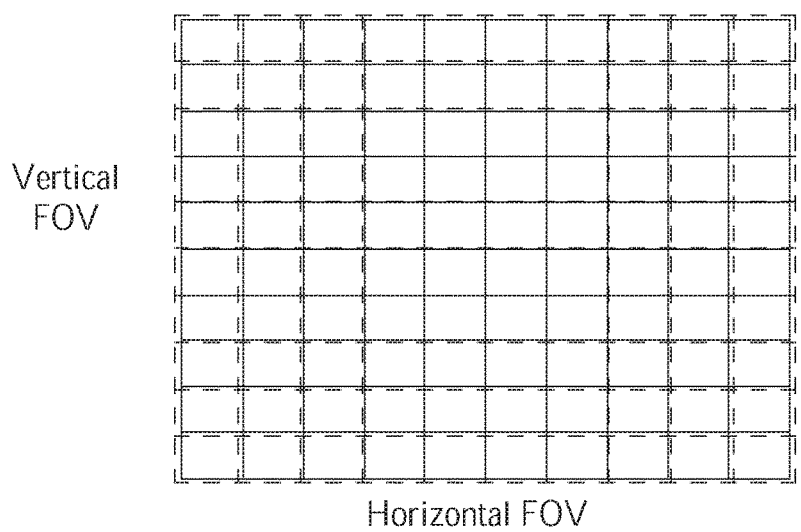
FIG. 7C shows a curve diagram of TV distortion of the optical image capturing system of the seventh embodiment of the present application.

As shown in FIG. 7A and FIG. 7B, an optical image capturing system of the seventh preferred embodiment of the present invention includes, along an optical axis from an object side to an image side, an aperture 700, a first lens 710, a second lens 720, a third lens 770, a fourth lens 740, an infrared rays filter 770, an image plane 780, and an image sensor 790.

The first lens 710 has positive refractive power, and is made of plastic. An object-side surface 712 thereof, which faces the object side, is a convex aspheric surface, and an image-side surface 714 thereof, which faces the image side, is a convex aspheric surface, and the object-side surface 712 has an inflection point.

The second lens 720 has positive refractive power, and is made of plastic. An object-side surface 722 thereof which faces the object side is a concave aspheric surface, and an image-side surface 724 thereof which faces the image side is a convex aspheric surface.

The third lens 730 has negative refractive power, and is made of plastic. An object-side surface 732, which faces the object side, is a concave aspheric surface, and an image-side surface 734, which faces the image side, is a convex aspheric surface. The image-side surface 732 has two inflection points, while the image-side surface 734 has an inflection point.

The fourth lens 740 has a positive refractive power, and is made of plastic. An object-side surface 742, which faces the object side, is a convex aspheric surface, and an image-side surface 744, which faces the image side, is a concave aspheric surface. The object-side surface 742 and the image-side surface 744 both have an inflection point respectively.

The infrared rays filter 770 is made of glass, and between the fourth lens 740 and the image plane 780. The infrared rays filter 770 gives no contribution to the focal length of the system.

The parameters of the lenses of the third preferred embodiment are |f2|+|f3|=6.3879 mm; |f1|+|f4|=7.3017 mm; and |f2|+|f3|<|f1|+|f4|, where f1 is a focal length of the first lens 710; f2 is a focal length of the second lens 720; f7 is a focal length of the third lens 730; and f4 is a focal length of the fourth lens 740.

The optical image capturing system of the third preferred embodiment further satisfies TP3=0.342 mm and TP4=0.876 mm, where TP3 is a thickness of the third lens 730 on the optical axis, and TP4 is a thickness of the fourth lens 740 on the optical axis.

The optical image capturing system of the third preferred embodiment further satisfies ΣPP=f1+f2+f4=10.9940 mm and f1/(f1+f2+f4)=0.2801, where ΣPP is a sum of the focal lengths of each positive lens. It is helpful to share the positive refractive power of the first lens 710 to other positive lenses to avoid the significant aberration caused by the incident rays.

The optical image capturing system of the third preferred embodiment further satisfies ΣNP=f3=−2.6956 mm and f3/(f3)=1, where ΣNP is a sum of the focal lengths of each negative lens.

The parameters of the lenses of the third embodiment are listed in Table 13 and Table 14.

TABLE 13 f = 2.6019 mm; f/HEP = 1.600; HAF = 40.700 deg; tan(HAF) = 0.8601

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1st lens/ Aperture | 1.71292 | 0.38171 | plastic | 1.54410 | 56.06368 | 3.07935 |
| 2 | | −82.93521 | 0.06127 | | | | |
| 3 | Shading Sheet | plane | 0.32214 | | | | |
| 4 | 2nd lens | −2.99453 | 0.55905 | plastic | 1.54410 | 56.06368 | 3.69227 |
| 5 | | −1.28410 | 0.18224 | | | | |
| 6 | 3rd lens | −0.49647 | 0.34177 | plastic | 1.64250 | 22.45544 | −2.69561 |
| 7 | | −0.88152 | 0.03097 | | | | |
| 8 | 4th lens | 1.05292 | 0.87625 | plastic | 1.53460 | 56.04928 | 4.22234 |
| 9 | | 1.39616 | 0.40577 | | | | |
| 10 | Filter | plane | 0.21 | BK7 | 1.51680 | 64.13477 | |
| 11 | | plane | 0.51339 | | | | |
| 12 | Image plane | plane | | | | | |

Reference wavelength: 555 nm.
The clear aperture of the third surface is 0.675 mm.

TABLE 14

Coefficients of the aspheric surfaces

| Surface | 1 | 2 | 4 | 5 | 6 | 7 | 8 | 9 |
|---|---|---|---|---|---|---|---|---|
| k | −8.09736E−01 | 9.90000E+01 | 1.38546E+01 | −4.78421E+00 | −3.91527E+00 | −1.53405E+00 | −1.19640E+01 | −5.30860E+00 |
| A4 | 3.11337E−04 | −1.47267E−01 | −2.45721E−01 | −2.55177E−01 | −1.04737E+00 | −8.42553E−02 | −3.47164E−02 | −5.45854E−02 |
| A6 | −4.23221E−01 | 2.05335E−01 | 1.11283E+00 | −1.35694E+00 | 1.91291E+00 | 1.14144E−01 | −1.11575E−01 | −3.54359E−03 |
| A8 | 1.99682E+00 | −2.29326E+00 | −7.97159E+00 | 5.61291E+00 | −1.03818E+00 | 4.85341E−01 | 1.55890E−01 | 1.43811E−02 |
| A10 | −8.98568E+00 | 6.67714E+00 | 2.67059E+01 | −1.27982E+01 | 8.28666E−02 | −5.78511E−01 | −1.02888E−01 | −8.50527E−03 |
| A12 | 2.55814E+01 | −1.26431E+01 | −4.89500E+01 | 1.83626E+01 | −7.20630E−01 | 1.37111E−01 | 3.67156E−02 | 2.28063E−03 |
| A14 | −4.56047E+01 | 1.25240E+01 | 4.32986E+01 | −1.54412E+01 | 8.84894E−01 | 8.58529E−02 | −6.09560E−03 | −2.76813E−04 |
| A16 | 3.35356E+01 | −4.95913E+00 | −1.11707E+01 | 5.47973E+00 | −3.65905E−01 | −3.73888E−02 | 1.92810E−04 | 9.06057E−06 |
| A18 | 0.00000E+00 | 0.00000E+00 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 | 0.00000E+00 | 0.00000E+00 |

An equation of the aspheric surfaces of the third embodiment is the same as that of the first embodiment, and the definitions are the same as well.

The exact parameters of the third embodiment (with main reference wavelength as 555 nm) based on Table 13 and Table 14 are listed in the following table:

| Seventh embodiment (main reference wavelength: 555 nm) | | | | | |
|---|---|---|---|---|---|
| InRS11 | InRS12 | InRS21 | InRS22 | InRS31 | InRS32 |
| 0.10245 | −0.04085 | −0.18437 | −0.44347 | −0.51083 | −0.37921 |
| InRS41 | InRS42 | InRSO | InRSI | Σ|InRS| | |
| 0.11772 | 0.04936 | 0.91538 | 0.91289 | 1.82827 | |
| Σ|InRS|/InTL | Σ|InRS|/HOS | (|InRS22| + |InRS31|)/IN23 | | (|InRS32| + |InRS41|)/IN34 | |

-continued

| Seventh embodiment (main reference wavelength: 555 nm) | | | | | |
|---|---|---|---|---|---|
| 0.66352 | 0.47065 | 5.2365 | | 16.0459 | |
| (\|InRS31\| + \|InRS32\| + \|InRS41\| + \|InRS42\|)/InTL | | | (\|InRS31\| + \|InRS32\| + \|InRS41\| + \|InRS42\|)/HOS | | |
| | 0.38366 | | | 0.27214 | |
| \|f/f1\| | \|f/f2\| | \|f/f3\| | \|f/f4\| | \|f1/f2\| | \|f2/f3\| |
| 0.84495 | 0.70469 | 0.96524 | 0.61622 | 0.83400 | 1.36973 |
| Σ PPR | Σ NPR | Σ PPR/\|Σ NPR\| | Σ PP | Σ NP | f1/Σ PP |
| 2.16586 | 0.96574 | 2.24387 | 0.38374 | 7.91461 | 8.02457 |
| f4/Σ NP | IN12/f | \|InRS41\|/TP4 | \|InRS42\|/TP4 | \|ODT\| | \|TDT\| |
| 0.53349 | 0.14736 | 0.13435 | 0.05633 | 2.57432 | 0.27626 |
| InTL | HOS | HOS/HOI | InS/HOS | InTL/HOS | Σ TP/InTL |
| 2.75540 | 3.88456 | 1.68894 | 0.97363 | 0.70932 | 0.78347 |
| HVT31 | HVT32 | HVT41 | HVT42 | HVT42/HOI | HVT42/HOS |
| 0 | 0 | 1.11330 | 1.39937 | 0.60842 | 0.36024 |

[Eighth Embodiment]

Figure 8A:
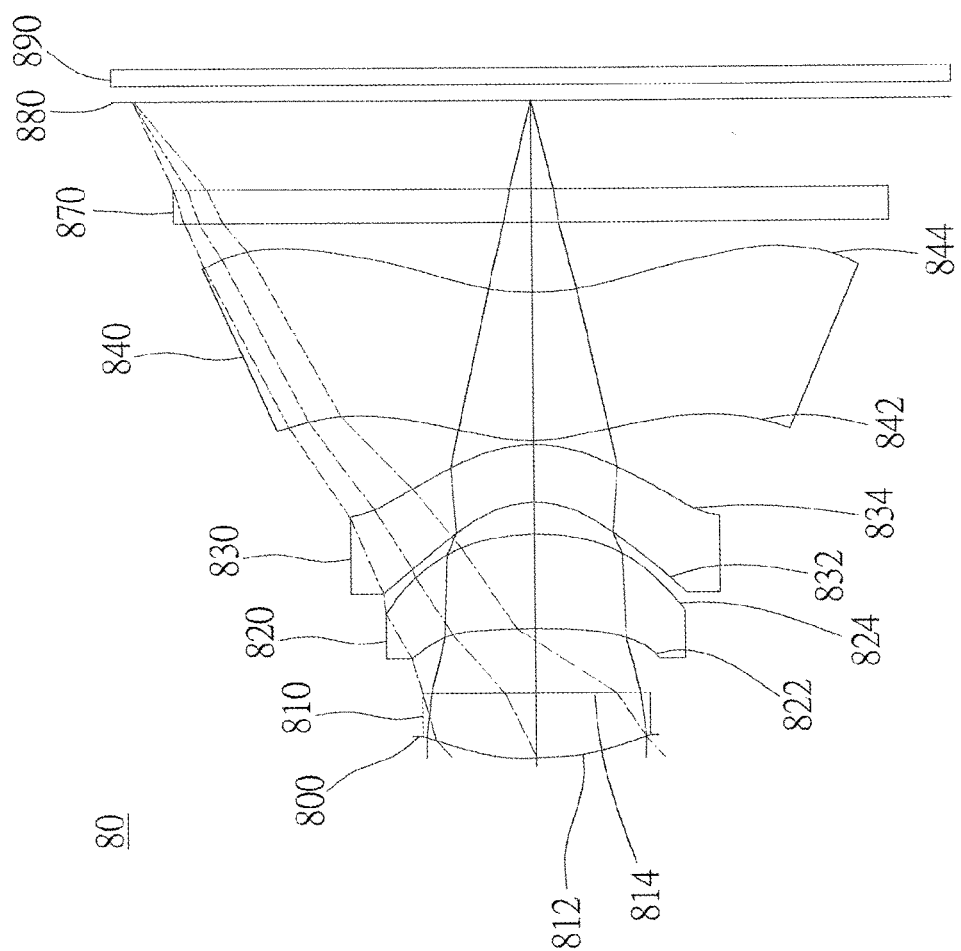
FIG. 8A is a schematic diagram of a eighth preferred embodiment of the present invention.
Figure 8B:
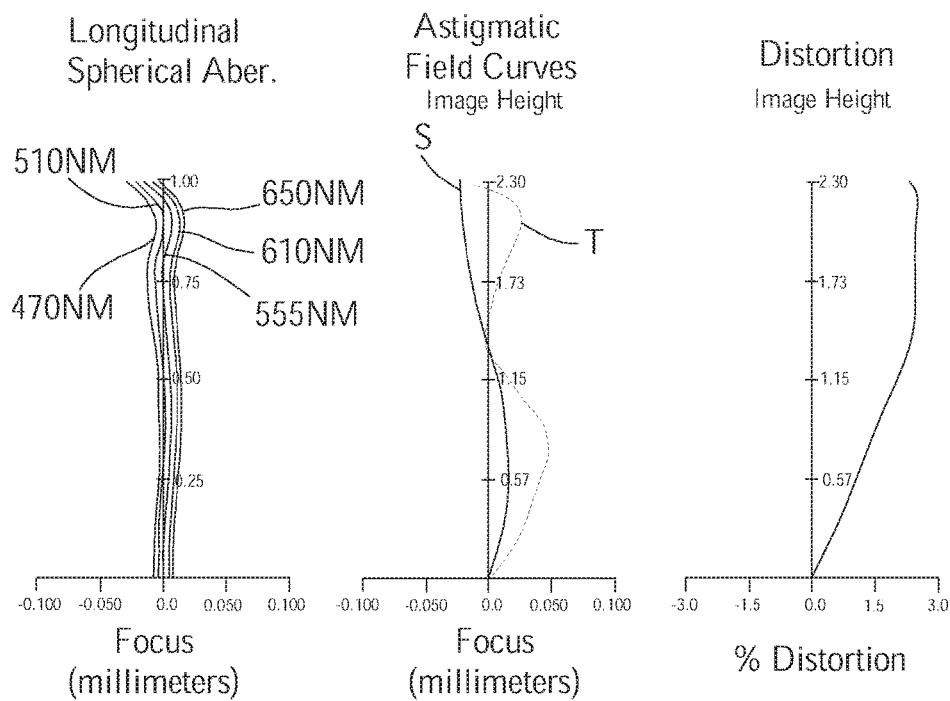
FIG. 8B shows curve diagrams of longitudinal spherical aberration, astigmatic field, and optical distortion of the optical image capturing system in the order from left to right of the eighth embodiment of the present application.
Figure 8C:
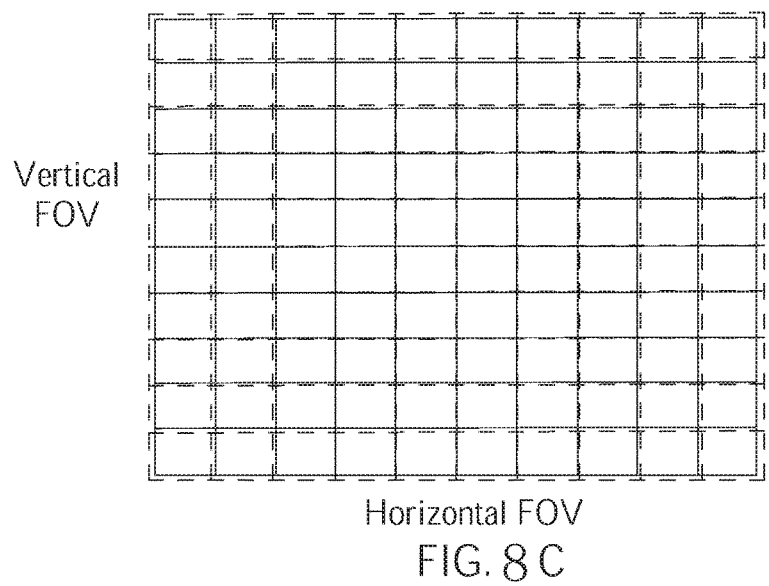
FIG. 8C shows a curve diagram of TV distortion of the optical image capturing system of the eighth embodiment of the present application.

As shown in FIG. 8A and FIG. 8B, an optical image capturing system of the third preferred embodiment of the present invention includes, along an optical axis from an object side to an image side, an aperture 800, a first lens 810, a second lens 820, a third lens 880, a fourth lens 840, an infrared rays filter 870, an image plane 880, and an image sensor 890.

The first lens 810 has positive refractive power, and is made of plastic. An object-side surface 812 thereof, which faces the object side, is a convex aspheric surface, and an image-side surface 814 thereof, which faces the image side, is a concave aspheric surface, and the object-side surface 812 and the image-side surface 814 both have an inflection point respectively.

The second lens 820 has negative refractive power, and is made of plastic. An object-side surface 822 thereof which faces the object side is a concave aspheric surface, and an image-side surface 824 thereof which faces the image side is a convex aspheric surface.

The third lens 830 has positive refractive power, and is made of plastic. An object-side surface 832, which faces the object side, is a concave aspheric surface, and an image-side surface 834, which faces the image side, is a convex aspheric surface. The object-side surface 832 has two inflection points, while the image-side surface 834 has an inflection point.

The fourth lens 840 has a negative refractive power, and is made of plastic. An object-side surface 842, which faces the object side, is a convex aspheric surface, and an image-side surface 844, which faces the image side, is a concave aspheric surface. The object-side surface 842 and the image-side surface 844 both have an inflection point respectively.

The infrared rays filter 870 is made of glass, and between the fourth lens 840 and the image plane 880. The infrared rays filter 870 gives no contribution to the focal length of the system.

The parameters of the lenses of the third preferred embodiment are \|f2\|+\|f3\|=5.7651 mm; \|f1\|+\|f4\|=7.6347 mm; and \|f2\|+\|f3\|<\|f1\|+\|f4\|, where f1 is a focal length of the first lens 810; f2 is a focal length of the second lens 820; f3 is a focal length of the third lens 830; and f4 is a focal length of the fourth lens 840.

The optical image capturing system of the third preferred embodiment further satisfies TP3=0.342 mm and TP4=0.876 mm, where TP3 is a thickness of the third lens 830 on the optical axis, and TP4 is a thickness of the fourth lens 840 on the optical axis.

The optical image capturing system of the third preferred embodiment further satisfies ΣPP=f1+f2+f4=10.8016 mm and f1/(f1+f2+f4)=0.3169, where ΣPP is a sum of the focal lengths of each positive lens. It is helpful to share the positive refractive power of the first lens 810 to other positive lenses to avoid the significant aberration caused by the incident rays.

The optical image capturing system of the third preferred embodiment further satisfies ΣNP=f3=−2.598 mm and f3/(f3)=1, where ΣNP is a sum of the focal lengths of each negative lens.

The parameters of the lenses of the third embodiment are listed in Table 15 and Table 16.

TABLE 15

| f = 2.602 mm; f/HEP = 2.051; HAF = 40.700 deg; tan(HAF) = 0.8601 | | | | | | |
|---|---|---|---|---|---|---|
| Surface | | Radius of curvature (mm) | Thickness (mm) | Material | Refractive index | Abbe number | Focal length (mm) |
| 0 | Object | plane | 600 | | | | |
| 1 | 1st lens/ Aperture | 1.56137 | 0.38171 | plastic | 1.54410 | 56.06368 | 3.42296 |
| 2 | | 8.67919 | 0.06127 | | | | |
| 3 | Shading Sheet | plane | 0.32214 | | | | |
| 4 | 2nd lens | −4.18777 | 0.55905 | plastic | 1.54410 | 56.06368 | 3.16687 |
| 5 | | −1.28128 | 0.18224 | | | | |
| 6 | 3rd lens | −0.49776 | 0.34177 | plastic | 1.64250 | 22.45544 | −2.59818 |
| 7 | | −0.89764 | 0.03097 | | | | |
| 8 | 4th lens | 1.05854 | 0.87625 | plastic | 1.53460 | 56.04928 | 4.21178 |
| 9 | | 1.41631 | 0.40577 | | | | |

TABLE 15-continued f = 2.602 mm; f/HEP = 2.051; HAF = 40.700 deg; tan(HAF) = 0.8601

| Surface | | Radius of curvature (mm) | Thickness (mm) | Material | Refractive index | Abbe number | Focal length (mm) |
|---|---|---|---|---|---|---|---|
| 10 | Filter | plane | 0.21 | BK7 | 1.51680 | 64.13477 | |
| 11 | | plane | 0.51339 | | | | |
| 12 | Image plane | plane | | | | | |

Reference wavelength: 555 nm.
The clear aperture of the second surface is 0.45 mm.

TABLE 16

Coefficients of the aspheric surfaces

| Surface | 1 | 2 | 4 | 5 | 6 | 7 | 8 | 9 |
|---|---|---|---|---|---|---|---|---|
| k   | 7.06758E−01  | 9.90000E+01  | 2.84329E+01  | −1.70758E+00 | −3.83499E+00 | −1.24082E+00 | −1.19640E+01 | −5.05896E+00 |
| A4  | −2.69167E−02 | −1.32998E−01 | −3.08525E−01 | −1.68528E−01 | −1.10160E+00 | −4.87334E−02 | −4.41395E−02 | −5.77518E−02 |
| A6  | −2.77792E−01 | 2.62372E−01  | 1.32713E+00  | −1.48439E+00 | 1.86752E+00  | 8.80821E−02  | −1.22090E−01 | −2.03495E−03 |
| A8  | 1.66898E+00  | −2.14319E+00 | −9.10404E+00 | 5.71121E+00  | −9.76525E−01 | 4.32119E−01  | 1.60177E−01  | 1.42962E−02  |
| A10 | −8.42648E+00 | 6.37998E+00  | 2.90907E+01  | −1.28499E+01 | 1.60948E−01  | −5.85268E−01 | −1.02654E−01 | −8.55909E−03 |
| A12 | 2.55814E+01  | −1.26431E+01 | −5.13915E+01 | 1.87544E+01  | −6.70051E−01 | 2.00849E−01  | 3.61092E−02  | 2.27967E−03  |
| A14 | −4.56047E+01 | 1.25240E+01  | 4.32838E+01  | −1.58331E+01 | 7.96067E−01  | 6.41102E−02  | −5.79879E−03 | −2.69472E−04 |
| A16 | 3.35356E+01  | −4.95913E+00 | −1.11707E+01 | 5.47973E+00  | −3.65905E−01 | −3.73888E−02 | 1.92810E−04  | 9.06057E−06  |
| A18 | | | | | | | | |
| A20 | | | | | | | | |

An equation of the aspheric surfaces of the third embodiment is the same as that of the first embodiment, and the definitions are the same as well.

The exact parameters of the third embodiment (with main reference wavelength as 555 nm) based on Table 15 and Table 16 are listed in the following table:

| Eighth embodiment (main reference wavelength: 555 nm) | | | | | |
|---|---|---|---|---|---|
| InRS11 | InRS12 | InRS21 | InRS22 | InRS31 | InRS32 |
| 0.12642 | −0.00468 | −0.17792 | −0.46224 | −0.53216 | −0.42421 |
| InRS41 | InRS42 | InRSO | InRSI | Σ\|InRS\| | |
| 0.08198 | 0.14557 | 0.91848 | 1.03670 | 1.95518 | |
| Σ\|InRS\|/InTL | Σ\|InRS\|/HOS | (\|InRS22\| + \|InRS31\|)/IN23 | | (\|InRS32\| + \|InRS41\|)/IN34 | |
| 0.70958 | 0.50332 | 5.4565 | | 16.3449 | |
| (\|InRS31\| + \|InRS32\| + \|InRS41\| + \|InRS42\|)/InTL | | | (\|InRS31\| + \|InRS32\| + \|InRS41\| + \|InRS42\|)/HOS | | |
| | 0.42967 | | | 0.30478 | |
| \|f/f1\| | \|f/f2\| | \|f/f3\| | \|f/f4\| | \|f1/f2\| | \|f2/f3\| |
| 0.76013 | 0.82160 | 1.00143 | 0.61776 | 1.08087 | 1.21888 |
| Σ PPR | Σ NPR | Σ PPR/\|Σ NPR\| | ΣPP | Σ NP | f1/Σ PP |
| 2.19949 | 1.00143 | 2.19635 | 0.82478 | 7.37865 | 4.15015 |
| f4/Σ NP | IN12/f | \|InRS41\|/TP4 | \|InRS42\|/TP4 | \|ODT\| | \|TDT\| |
| 0.57081 | 0.14736 | 0.09356 | 0.16613 | 2.50131 | 0.25090 |
| InTL | HOS | HOS/HOI | InS/HOS | InTL/HOS | Σ TP/InTL |
| 2.75540 | 3.88456 | 1.68894 | 0.96746 | 0.70932 | 0.78347 |
| HVT31 | HVT32 | HVT41 | HVT42 | HVT42/HOI | HVT42/HOS |
| 0 | 0 | 0.98319 | 1.41703 | 0.61610 | 0.36479 |

It must be pointed out that the embodiments described above are only some preferred embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
a first lens having positive refractive power;
a second lens having negative refractive power;
a third lens having refractive power;
a fourth lens having refractive power; and
an image plane;
wherein the optical image capturing system consists of the four lenses with refractive power; at least one of the lenses from the second lens to the fourth lens has positive refractive power; the fourth lens has an object-side surface, which faces the object side, and an image-side surface, which faces the image side, and both the object-side surface and the image-side surface of the fourth lens are aspheric surfaces;
wherein the optical image capturing system satisfies:

$1.2 \leq f/HEP \leq 3.5$;

$0.5 \leq HOS/f \leq 3.0$; and $0 < \Sigma|InRS|/InTL \leq 3$;

where f1, f2, f3, and f4 are focal lengths of the first lens to the fourth lens, respectively; f is a focal length of the optical image capturing system; HEP is an entrance pupil diameter of the optical image capturing system;

HOS is a distance in parallel with the optical axis from an object-side surface of the first lens to the image plane; $\Sigma|InRS|$ is a sum of InRSO and InRSI, where InRSO is a sum of absolute values of the displacements in parallel with the optical axis of each lens with refractive power from the central point on the object-side surface to the point at the maximum effective semi diameter of the object-side surface, and InRSI is a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fourth lens.

2. The optical image capturing system of claim 1, wherein the optical image capturing system further satisfies:

$|TDT|<60\%$;

where TDT is a TV distortion.

3. The optical image capturing system of claim 1, wherein t the optical image capturing system further satisfies:

$|ODT|<50\%$;

where ODT is an optical distortion.

4. The optical image capturing system of claim 1, wherein the optical image capturing system further satisfies:

0 mm<HOS≤7 mm.

5. The optical image capturing system of claim 1, wherein the optical image capturing system further satisfies:

0 deg<HAF≤70 deg;

where HAF is a half of a view angle of the optical image capturing system.

6. The optical image capturing system of claim 1, wherein the fourth lens has negative refractive power.

7. The optical image capturing system of claim 1, wherein the optical image capturing system further satisfies:

$0.45 \le InTL/HOS \le 0.9$.

8. The optical image capturing system of claim 1, wherein the optical image capturing system further satisfies:

$0.45 \le \Sigma TP/InTL \le 0.95$;

where $\Sigma TP$ is a sum of thicknesses of the lenses having refractive power.

9. The optical image capturing system of claim 5, further comprising an aperture and an image sensor on the image plane, wherein the optical image capturing system further satisfies:

$0.5 \le InS/HOS \le 1.1$;

where InS is a distance in parallel with the optical axis between the aperture and the image plane.

10. An optical image capturing system, in order along an optical axis from an object side to an image side, comprising:
a first lens having positive refractive power;
a second lens having negative refractive power;
a third lens having refractive power;
a fourth lens having refractive power; and
an image plane;
wherein the optical image capturing system consists of the four lenses with refractive power; at least two of the lenses from the first lens to the fourth lens each has at least an inflection point on a surface thereof; at least one of the lenses from the second lens to the fourth lens has positive refractive power; the fourth lens has an object-side surface, which faces the object side, and an image-side surface, which faces the image side, and both the object-side surface and the image-side surface of the fourth lens are aspheric surfaces;
wherein the optical image capturing system satisfies:

$1.2 \le f/HEP \le 3.5$;

$0.5 \le HOS/f \le 3.0$; and $0 < \Sigma|InRS|/InTL \le 3$;

where f1, f2, f3, and f4 are focal lengths of the first lens to the fourth lens, respectively; f is a focal length of the optical image capturing system; HEP is an entrance pupil diameter of the optical image capturing system; HOS is a distance in parallel with the optical axis between an object-side surface, which face the object side, of the first lens and the image plane; $\Sigma|InRS|$ is a sum of InRSO and InRSI, where InRSO is a sum of absolute values of the displacements in parallel with the optical axis of each lens with refractive power from the central point on the object-side surface to the point at the maximum effective semi diameter of the object-side surface, and InRSI is a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fourth lens.

11. The optical image capturing system of claim 10, wherein the fourth lens has negative refractive power, and has at least an inflection point on at least one of the object-side surface and the image-side surface thereof.

12. The optical image capturing system of claim 10, wherein the optical image capturing system further satisfies:

$0.5 \le \Sigma PPR \le 10$;

where PPR is a ratio of the focal length f of the optical image capturing system to a focal length fp of each of lenses with positive refractive power.

13. The optical image capturing system of claim 10, wherein the optical image capturing system further satisfies:

$|TDT|<60\%$; and $|ODT|<50\%$;

where TDT is a TV distortion and ODT is an optical distortion.

14. The optical image capturing system of claim 10, wherein the fourth lens has negative refractive power.

15. The optical image capturing system of claim 10, wherein the optical image capturing system further satisfies:

0 mm<$\Sigma|InRS|$≤10 mm.

16. The optical image capturing system of claim 10, wherein the optical image capturing system further satisfies:

0 mm<$|InRS31|+|InRS32|+|InRS41|+|InRS42|$≤8 mm;

where InRS31 is a displacement in parallel with the optical axis from a point on the object-side surface of the third lens, through which the optical axis passes, to a point at the maximum effective semi diameter of the object-side surface of the third lens; InRS32 is a displacement in parallel with the optical axis from a point on the image-side surface of the third lens, through which the optical axis passes, to a point at the maximum effective semi diameter of the image-side surface of the third lens; InRS41 is a displacement in parallel with the optical axis from a point on the object-side surface of the fourth lens, through which the optical axis passes, to a point at the maximum effective semi diameter of the object-side surface of the fourth lens; InRS42 is a displacement in parallel with the optical axis from a point on the image-side surface of the fourth lens, through which the optical axis passes, to a point at the maximum effective semi diameter of the image-side surface of the fourth lens.

17. The optical image capturing system of claim 16, wherein the optical image capturing system further satisfies:

$$0<(|InRS31|+|InRS32|+|InRS41|+|InRS42|)/InTL\leq 2.$$

18. The optical image capturing system of claim 16, wherein the optical image capturing system further satisfies:

$$0<(|InRS31|+|InRS32|+|InRS41|+|InRS42|)/HOS\leq 2.$$

19. The optical image capturing system of claim 10, wherein the optical image capturing system further satisfies:

$$0<f1/\Sigma PP\leq 0.8;$$

where $\Sigma PP$ is a sum of focal lengths of all the lenses having positive refractive power.

20. An optical image capturing system, in order along an optical axis from an object side to an image side, comprising:
    a first lens having positive refractive power;
    a second lens having negative refractive power;
    a third lens having refractive power;
    a fourth lens having refractive power, and having at least an inflection point on at least one of an image-side surface, which faces the image side, and an object-side surface, which faces the object side; and
    an image plane;
    wherein the optical image capturing system consists of the four lenses having refractive power; at least two of the lenses from the first lens to the third lens each has at least one inflection point on at least a surface thereof; the first lens has an object-side surface, which faces the object side, and an image-side surface, which faces the image side, and both the object-side surface and the image-side surface of the first lens are aspheric surfaces; the object-side surface and the image-side surface of the fourth lens are aspheric surfaces;
    wherein the optical image capturing system satisfies:

$$1.2\leq f/HEP\leq 3.5;$$

$$0.4\leq |\tan(HAF)|\leq 1.5;$$

$$0.5\leq HOS/f\leq 2.5;$$

$$|TDT|<1.5\%;$$

$$|ODT|\leq 2.5\%; \text{ and}$$

$$0<\Sigma|InRS|/InTL\leq 3;$$

where f1, f2, f3, and f4 are focal lengths of the first lens to the fourth lens, respectively; f is a focal length of the optical image capturing system; HEP is an entrance pupil diameter of the optical image capturing system; HAF is a half of a view angle of the optical image capturing system; HOS is a distance in parallel with the optical axis between an object-side surface, which face the object side, of the first lens and the image plane; TDT is a TV distortion; ODT is an optical distortion; $\Sigma|InRS|$ is a sum of InRSO and InRSI, where InRSO is a sum of absolute values of the displacements in parallel with the optical axis of each lens with refractive power from the central point on the object-side surface to the point at the maximum effective semi diameter of the object-side surface, and InRSI is a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fourth lens.

21. The optical image capturing system of claim 20, wherein the optical image capturing system further satisfies:

$$0<f1/\Sigma PP\leq 0.8;$$

where f1 is a focal length of the first lens, and $\Sigma PP$ is a sum of focal lengths of all the lenses having positive refractive power.

22. The optical image capturing system of claim 20, wherein the optical image capturing system further satisfies:

$$0 \text{ mm}<HOS\leq 7 \text{ mm}.$$

23. The optical image capturing system of claim 20, wherein the optical image capturing system further satisfies:

$$0 \text{ mm}<|InRS31|+|InRS32|+|InRS41|+|InRS42|\leq 8 \text{ mm};$$

where InRS31 is a displacement in parallel with the optical axis from a point on the object-side surface of the third lens, through which the optical axis passes, to a point at the maximum effective semi diameter of the object-side surface of the third lens; InRS32 is a displacement in parallel with the optical axis from a point on the image-side surface of the third lens, through which the optical axis passes, to a point at the maximum effective semi diameter of the image-side surface of the third lens; InRS41 is a displacement in parallel with the optical axis from a point on the object-side surface of the fourth lens, through which the optical axis passes, to a point at the maximum effective semi diameter of the object-side surface of the fourth lens; InRS42 is a displacement in parallel with the optical axis from a point on the image-side surface of the fourth lens, through which the optical axis passes, to a point at the maximum effective semi diameter of the image-side surface of the fourth lens.

24. The optical image capturing system of claim 23, wherein the optical image capturing system further satisfies:

$$0<(|InRS31|+|InRS32|+|InRS41|+|InRS42|)/InTL\leq 2.$$

25. The optical image capturing system of claim 23, further comprising an aperture and an image sensor on the image plane, wherein the optical image capturing system further satisfies:

$$0.5\leq InS/HOS\leq 1.1;$$

where InS is a distance in parallel with the optical axis between the aperture and the image plane.

* * * * *